(12) United States Patent
Ikeda

(10) Patent No.: US 7,505,761 B2
(45) Date of Patent: Mar. 17, 2009

(54) WIRELESS TERMINAL DEVICE, WIRELESS COMMUNICATION METHOD, AND COMPUTER PROGRAM

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 11/373,185

(22) Filed: Mar. 13, 2006

(65) Prior Publication Data

US 2006/0225089 A1 Oct. 5, 2006

(30) Foreign Application Priority Data

Mar. 30, 2005 (JP) ............................. 2005-099517

(51) Int. Cl.
*H04B 1/10* (2006.01)
(52) U.S. Cl. ............... 455/418; 370/395.41; 370/395.4; 370/445; 370/449
(58) Field of Classification Search ............ 370/395.41, 370/445, 449; 455/418, 458
See application file for complete search history.

(56) References Cited

U.S. PATENT DOCUMENTS

| | | | | |
|---|---|---|---|---|
| 6,990,116 B1 * | 1/2006 | Young et al. | ................. | 370/445 |
| 7,239,888 B2 * | 7/2007 | Coffey | ..................... | 455/550.1 |
| 2002/0071448 A1 * | 6/2002 | Cervello et al. | ............. | 370/445 |
| 2003/0125087 A1 * | 7/2003 | Shimizu | ...................... | 455/561 |
| 2004/0038684 A1 | 2/2004 | Sugaya | ......................... | 455/450 |
| 2004/0105412 A1 * | 6/2004 | He et al. | ...................... | 370/338 |
| 2007/0217385 A1 * | 9/2007 | Meier | ......................... | 370/338 |

FOREIGN PATENT DOCUMENTS

| | | |
|---|---|---|
| JP | 2002-185462 | 6/2002 |
| JP | 2003-198564 | 7/2003 |
| JP | 2004-040336 | 2/2004 |

* cited by examiner

*Primary Examiner*—Charles N Appiah
*Assistant Examiner*—Kwasi Karikari
(74) *Attorney, Agent, or Firm*—Fitzpatrick, Cella, Harper & Scinto

(57) ABSTRACT

An object of this invention is to allow a wireless terminal device to issue a request of connection using a distributed control method or central control method to a wireless control device in consideration of connection states of wireless terminal devices other than itself under management of the wireless control device. A wireless terminal device (101) acquires a beacon frame interval (602), maximum contention free period (CFP) duration (604), and CF-END average time (701) from beacon information (M800) announced from a wireless video processing device (102). The wireless terminal device determines an access control method based on a first conditional formula (702) and second conditional formula (703) using them (602, 604 and 701). The wireless terminal device transmits a TS addition request message (M906) which includes the determined access control method, type information, and bandwidth request to the wireless video processing device (102).

7 Claims, 28 Drawing Sheets

| QAP | Beacon Interval (T) (μs) | CFP MaxDuration (P) (μs) | CF-END AVERAGE TIME (S) (μs) | FIRST CONDITIONAL FORMULA | SECOND CONDITIONAL FORMULA | ACCESS CONTROL METHOD |
|---|---|---|---|---|---|---|
| E711 | 10000 | 5000 | 2000 | P=T/2 | S<T/2 | EDCA |
| E712 | 10000 | 5000 | 5000 | | S≥T/2 | HCCA/EDCA |
| E713 | 10000 | 8000 | 3000 | P>T/2 | S<T/2 | EDCA |
| E714 | 10000 | 8000 | 5000 | | S=T/2 | HCCA/EDCA |
| E715 | 10000 | 8000 | 8000 | | S>T/2 | HCCA |
| E716 | 10000 | 3000 | 3000 | P<T/2 | — | EDCA |
| E717 | 10000 | 3000 | 1000 | | — | EDCA |

FIG. 6

| QAP | Beacon Interval (T) (μs) | CFP MaxDuration (P) (μs) | CF-END AVERAGE TIME (S) (μs) | FIRST CONDITIONAL FORMULA | SECOND CONDITIONAL FORMULA | ACCESS CONTROL METHOD |
|---|---|---|---|---|---|---|
| E711 | 10000 | 5000 | 2000 | $P=T/2$ | $S<T/2$ | EDCA |
| E712 | 10000 | 5000 | 5000 | | $S\geq T/2$ | HCCA/ EDCA |
| E713 | 10000 | 8000 | 3000 | $P>T/2$ | $S<T/2$ | EDCA |
| E714 | 10000 | 8000 | 5000 | | $S=T/2$ | HCCA/ EDCA |
| E715 | 10000 | 8000 | 8000 | | $S>T/2$ | HCCA |
| E716 | 10000 | 3000 | 3000 | $P<T/2$ | – | EDCA |
| E717 | 10000 | 3000 | 1000 | | – | EDCA |

FIG. 27

| QAP | Beacon Interval (T) (μs) | CFP MaxDuration (P) (μs) | POLLING COUNT (N) | FIRST CONDITIONAL FORMULA | THIRD CONDITIONAL FORMULA (μs) | ACCESS CONTROL METHOD |
|---|---|---|---|---|---|---|
| E2411 | 10000 | 8000 | 5 | P>T/2 | – | HCCA |
| E2412 | 10000 | 8000 | 1 | | – | HCCA |
| E2413 | 10000 | 5000 | 8 | P=T/2 | P/N<1000 | HCCA |
| E2414 | 10000 | 5000 | 5 | | P/N=1000 | HCCA/EDCA |
| E2415 | 10000 | 5000 | 1 | | P/N>1000 | EDCA |
| E2416 | 10000 | 3000 | 5 | P<T/2 | – | EDCA |
| E2417 | 10000 | 3000 | 1 | | – | EDCA |

WIRELESS TERMINAL DEVICE, WIRELESS COMMUNICATION METHOD, AND COMPUTER PROGRAM

FIELD OF THE INVENTION

The present invention relates to a wireless terminal device, wireless communication method, and computer program and, more particularly, to a wireless communication technique which can be applied to a wireless LAN system in which wireless terminal devices that exist within an area managed by a wireless control device make wireless communications under the control of the wireless control device.

BACKGROUND OF THE INVENTION

In general, a wireless LAN system is formed by wireless mobile terminals and an access point device. Note that the wireless mobile terminals are wireless terminal devices which make data communications with each other via a wireless transmission path and wired LAN. The access point device is a wireless control device which makes wireless communications with a plurality of wireless mobile terminals within a service area, and has a bridge or router function that connects a wireless section and wired LAN.

IEEE 802.11 as the standard of a wireless LAN specifies a wireless access protocol between a wireless access station and terminal. The wireless access protocol specifies DCF as a contention-based random access function based on CSMA/CA (Carrier Sense Multiple Access with Collision Avoidance). The DCF is an abbreviation for Distributed Coordination Function. The DCF further specifies CFP (Point Coordination Function) as an optional function. This CFP is a function of periodically setting a CFP (Contention Free Period) on a wireless transmission path used by a wireless access station to communicate with a terminal, and making contention free access by polling during the CFP duration.

The aforementioned IEEE 802.11 standard specifies various parameters of the DCF and CFP. However, in this standard, the control of the DCF and CFP depends on an implemented product, and no detailed contents are specified. Under such background, some implementation methods have been proposed.

For example, Japanese Patent Laid-Open No. 2002-185462 proposes a method of switching selection of a communication mode depending on application purposes. More specifically, when data to be exchanged places an importance on realtimeness, the CFP as a central control type communication mode is selected. When an importance is placed on reliability, the DCF as a distributed autonomous type communication mode is selected.

As another implementation method, for example, Japanese Patent Laid-Open No. 2003-198564 (US2003125087A1) proposes a method of switching a communication mode depending on the situation. With this reference, an AP (Access Point) detects the average data size of data frames exchanged with an STA (Station). When a state in which the average data size exceeds a predetermined value continues for a predetermined period of time, the communication mode is switched from the DCF to the CFP. Alternatively, when a state in which the ratio of transmission data stored in the AP itself exceeds a predetermined value continues for a predetermined period of time, the communication mode is switched from the DCF to the CFP.

Furthermore, for example, Japanese Patent Laid-Open No. 2004-40336 (US2004038684A1) proposes still another method of switching a communication mode depending on the situation. With this reference, an AP performs transmission/reception based on the DCF method initially. When a data size stored in a buffer exceeds a predetermined value, the communication mode is switched to the CFP. When no data is stored in the buffer, the communication mode is switched to the DCF.

On the other hand, as a recent trend, a concept called QoS (Quality of Service) is introduced into these data communications as wireless transmission. In order to assure the priority order and bandwidth depending on the contents and purpose of data, task group TGe of IEEE 802.11 makes examination. In the following description, task group TGe IEEE 802.11 will be referred to as IEEE 802.11e.

In IEEE 802.11e (see IEEE 802.11e/D8.0 February 2004), a connection transmission path of data to be wirelessly transmitted is called traffic stream TS. A data type called access category AC according to the data contents is specified for each traffic stream TS. Furthermore, as a distributed control method which specifies the priority order for respective access categories AC, and implements access control according to the priority order, an EDCA (Enhanced Distributed Channel Access) access control method is specified. Moreover, as a central control method that implements access control according to the priority order, an HCCA (Hybrid coordination function Controlled Channel Access) access control method is specified.

By contrast, in the prior art described in Japanese Patent Laid-Open No. 2002-185462, one of the CFP and DCF is selected with reference to the realtimeness and reliability of data to be exchanged, as described above. That is, the communication mode is selected irrespective of the connection situation of wireless client terminals (wireless terminal devices) within a wireless service area in which they are connected and accommodated. Such implementation method is not preferable in terms of QoS control in the service area which includes different access control methods together.

In the prior art described in Japanese Patent Laid-Open No. 2003-198564 (US2003125087A1), the communication mode is switched from the DCF to the CFP when a state in which the average data size of data frames to be exchanged exceeds a predetermined value continues for a predetermined period of time. Alternatively, when a state in which the ratio of transmission data stored in a wireless control device itself exceeds a predetermined value continues for a predetermined period of time, the communication mode is switched from the DCF to the CFP. That is, the prior art is limited to data transmission control from the wireless control device to wireless client terminals. For this reason, this technique cannot be applied to QoS control associated with the uplink in a direction from the wireless client terminal to the wireless control device.

Furthermore, the prior art described in Japanese Patent Laid-Open No. 2004-40336 (US2004038684A1) is also intended for data transmission control from the wireless control device to the wireless client terminals, and determines the traffic state based on the remaining size of the data buffer in the wireless control device. For this reason, this technique cannot be applied to QoS control associated with the uplink in a direction from the wireless client terminal to the wireless control device. That is, the techniques described in Japanese Patent Laid-Open Nos. 2003-198564 (US2003125087A1) and 2004-40336 (US2004038684A1) are QoS control on the initiative of the wireless control device.

As described above, the aforementioned prior arts merely describe QoS control associated with data transmission in a downstream direction from a coordinator that controls the CFP method to wireless client terminals. As for QoS control associated with data transmission in an upstream direction from the wireless client terminal to the wireless control device, no solution is described.

In any case, since the special QoS control in the initiative of the wireless control device is provided, the wireless control device must comprise an expansive or additional QoS control function (within the service area), resulting in an increase in cost of the device itself.

SUMMARY OF THE INVENTION

The present invention has been made in consideration of the aforementioned problems, and has as its object to allow a wireless terminal device to request a wireless control device to switch a communication mode in consideration of the connection state of the wireless terminal device.

In order to achieve the above object, a wireless terminal device of the present invention is a wireless terminal device which undergoes communication control by a wireless control device via a wireless transmission path when the wireless terminal device exists within an area managed by the wireless control device, comprising:

interpretation unit configured to interpret annunciation information transmitted from the wireless control device; and request unit configured to request the wireless control device to make a communication using one of a central control method and distributed control method based on the interpretation result of the interpretation unit.

In order to achieve the above object, a wireless communication method of the present invention is a wireless communication method with which a wireless control device and a wireless terminal device which exists within an area managed by the wireless control device communicate with each other via a wireless transmission path, comprising:

an interpretation step of causing the wireless terminal device to interpret information transmitted from the wireless control device; and a request step of requesting the wireless control device to make a communication using one of a central control method and distributed control method based on the interpretation result in the interpretation step.

In order to achieve the above object, a computer program of the present invention is a computer program which makes a computer execute communication control of a wireless terminal device, characterized by making the computer execute:

an interpretation step of interpreting information transmitted from a wireless control device; and a request step of requesting the wireless control device to make a communication using one of a central control method and distributed control method based on the interpretation result in the interpretation step.

According to the present invention, the wireless terminal device can request the wireless control device to switch the communication mode in consideration of the connection state of the wireless terminal device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of the configuration of an access control method determination table according to the first embodiment of the present invention;

FIG. 27 shows an example of the configuration of an access control method determination table according to the third modification of the embodiment of the present invention.

DETAILED DESCRIPTION OF THE PREFERRED EMBODIMENTS

Preferred embodiments of the present invention will now be described in detail in accordance with the accompanying drawings.

A wireless LAN system formed using a wireless terminal device which supports a QoS function under examination in IEEE 802.11e will be exemplified hereinafter. The wireless LAN system to be described below is a wireless LAN system in which the QoS function under examination in IEEE 802.11e is added to a wireless LAN method compatible to the IEEE 802.11a/b/g standards.

First Embodiment

Figure 1:
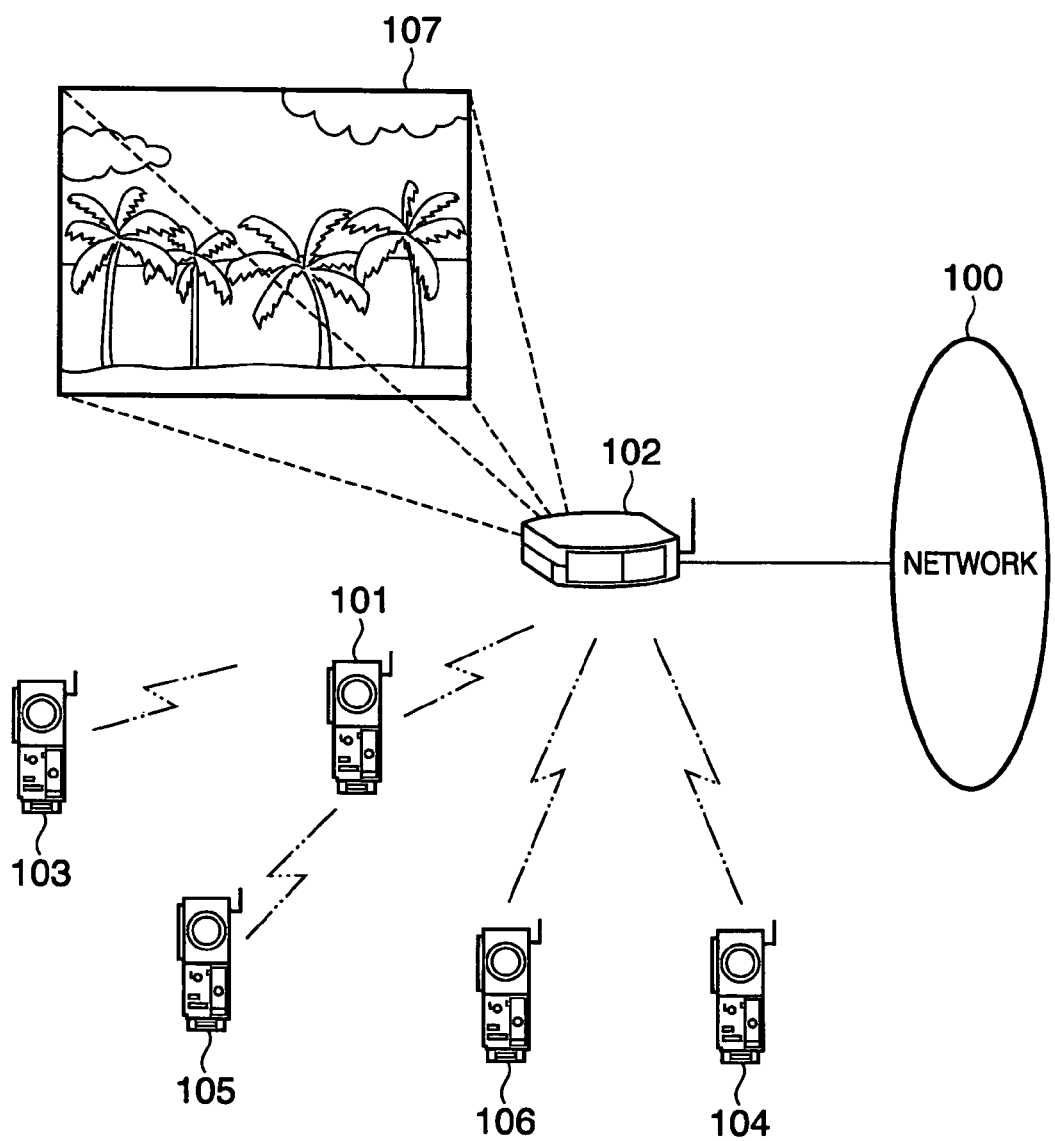
FIG. 1 is a view showing an example of the arrangement of a wireless LAN system (wireless video transmission system) according to the first embodiment of the present invention.

FIG. 1 is a view showing an example of the arrangement of a wireless LAN system (wireless video transmission system) according to this embodiment.

Referring to FIG. 1, a wireless video processing device (QAP) 102 which comprises a wireless access point function communicates beacon frame information unique to an infrastructure network within a service area provided by itself using an arbitrary group identifier. The wireless video processing device (QAP) 102 supports the EDCA/HCCA dual access control method by an HC (Hybrid Coordinator) function unique to IEEE 802.11e. Furthermore, the wireless video processing device 102 is connected to a network 100 via a wired interface, and provides a data carry control/route selection function on the network 100.

A wireless terminal device (QSTA) 101, which comprises a wireless communication function, QoS function, and image sensing function, forms a network with the wireless video processing device 102 via wireless connection. Other wireless terminal devices (QSTA) 103 to 106 comprise a wireless communication function and QoS function as in the wireless terminal device (QSTA) 101, and form a network with the wireless video processing device 102 via wireless connection. The wireless video processing device 102 is a wireless access point device which comprises a function of projecting stream data such as movie data or the like received from the wireless terminal devices 101 and 103 to 106 within the service area onto a projection screen 107 located in front of it.

Figure 2:
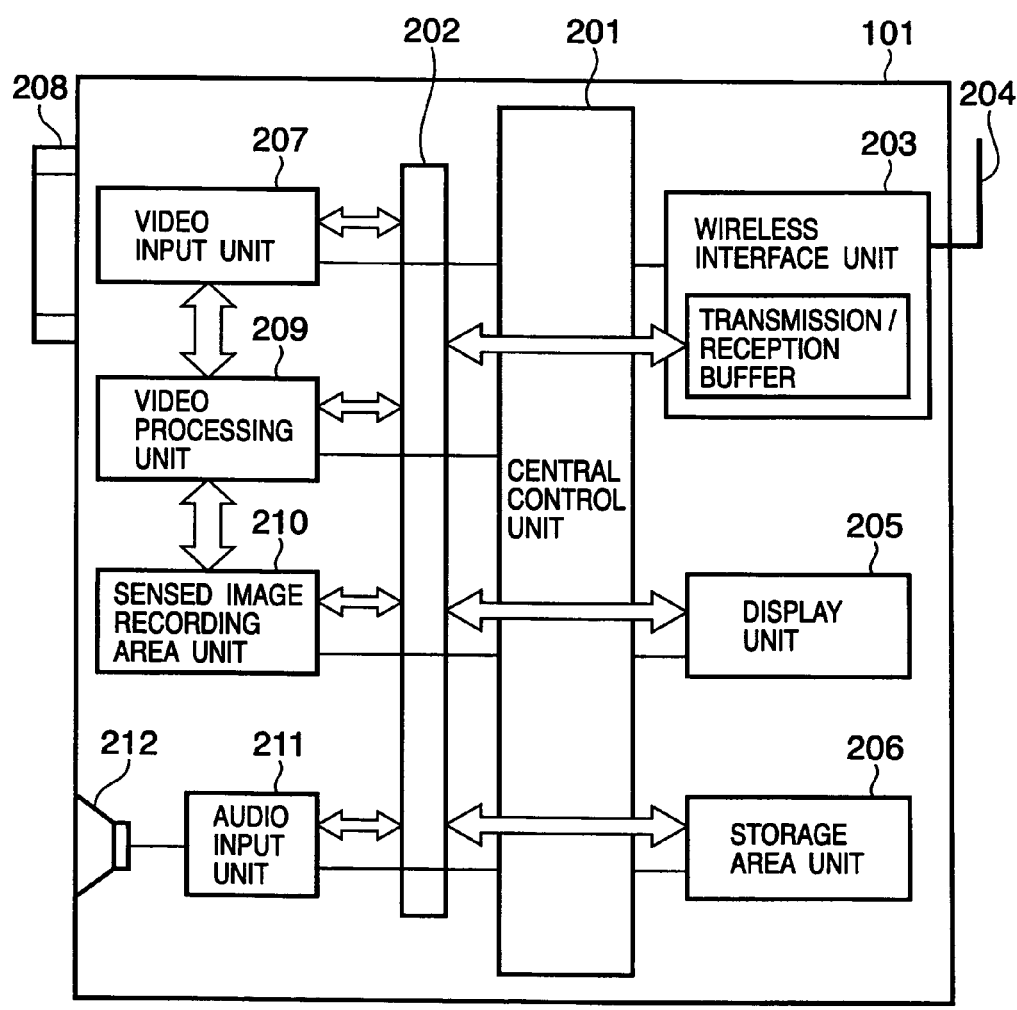
FIG. 2 is a block diagram showing an example of the internal arrangement of a wireless terminal device according to an embodiment of the present invention.

FIG. 2 is a block diagram showing an example of the internal arrangement of the wireless terminal device 101 of this embodiment.

Referring to FIG. 2, a central control unit 201 performs system control for respective functional units including a data bus 202 of the wireless terminal device 101. A wireless interface unit 203 makes a wireless communication with the wireless video processing device 102 via an antenna 204. A display unit 205 makes status display associated with device settings and the activation states of other wireless terminal devices 103 to 106. A storage area unit 206 comprises a volatile memory which is made up of a work area and temporary area used by respective functional units in the system, and a nonvolatile memory which stores a control program, setting data, and the like of the device.

A video input unit 207 executes image processing of sensed image information captured via a lens unit 208, and passes that image data to a video processing unit 209. Audio information input via a microphone 212 simultaneously with the sensed image information is converted into audio data by an audio input unit 211, and the audio data is then transmitted to a video processing unit 209 via the data bus 202. The video processing unit 209 converts the image data and audio data into predetermined formats, and stores the converted data in a sensed image recording area unit 210.

Figure 3:
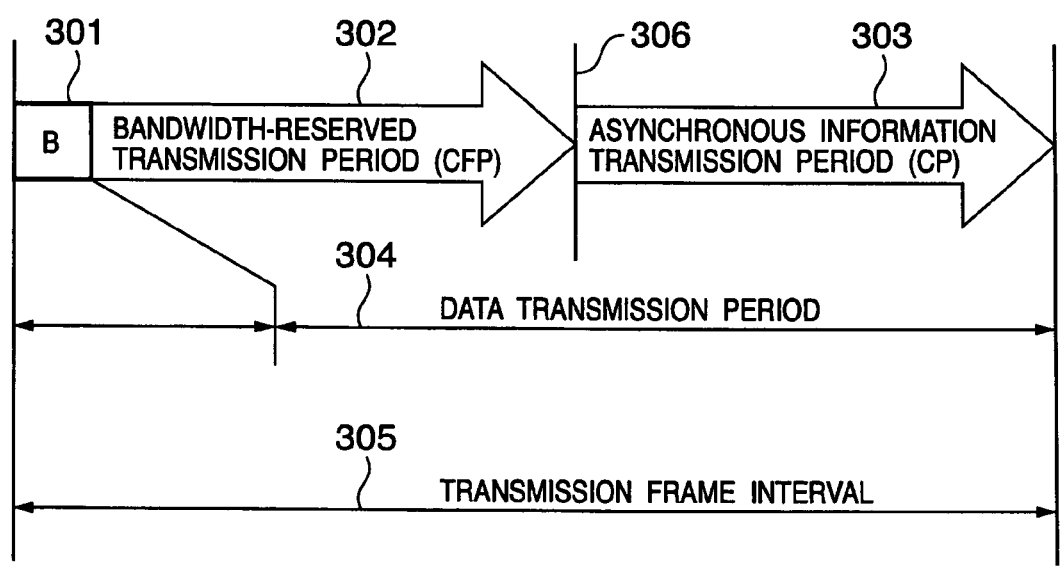
FIG. 3 is a view showing an example of the format of a wireless LAN transmission frame according to the first embodiment of the present invention.

FIG. 3 shows an example of the format of a wireless LAN transmission frame.

Referring to FIG. 3, a beacon information transmission period 301 is a management period (frame synchronous area) used to communicate information including frame synchronous information and network common information, and is allocated at the head of a frame. The beacon information is assigned to each communication station that forms a network. With this beacon information, transmissions of a plurality of communication stations can be prevented from contention.

Information of a period which is bandwidth-reserved in a data transmission period 304, information of an asynchronous period, and the like are included as this beacon information. That is, the data transmission period 304 is formed by a bandwidth-reserved transmission period 302 which is set as needed, and an asynchronous transmission period 303 as the remaining period. A CF-END 306 is a message indicating the end of the bandwidth-reserved transmission period (CFP) 302.

The bandwidth-reserved transmission period 302 is also called a contention free period (CFP), which is a time domain which can be exclusively used by an arbitrary wireless terminal device by polling from the wireless video processing device 102. The asynchronous information transmission period 303 is also called a contention period (CP), which is a time domain in which communications are randomly made using a predetermined sequence (CSMA/CA).

A transmission frame interval 305 represents that the beacon information transmission period 301 and data transmission period 304 are assured. Especially, as for the EDCA and HCCA access control methods unique to IEEE 802.11e, the EDCA access control method corresponds to the asynchronous information transmission period 303 as the contention period. The HCCA access control method corresponds to the bandwidth-reserved transmission period (CFP) 302 as the contention free period.

Figure 4:
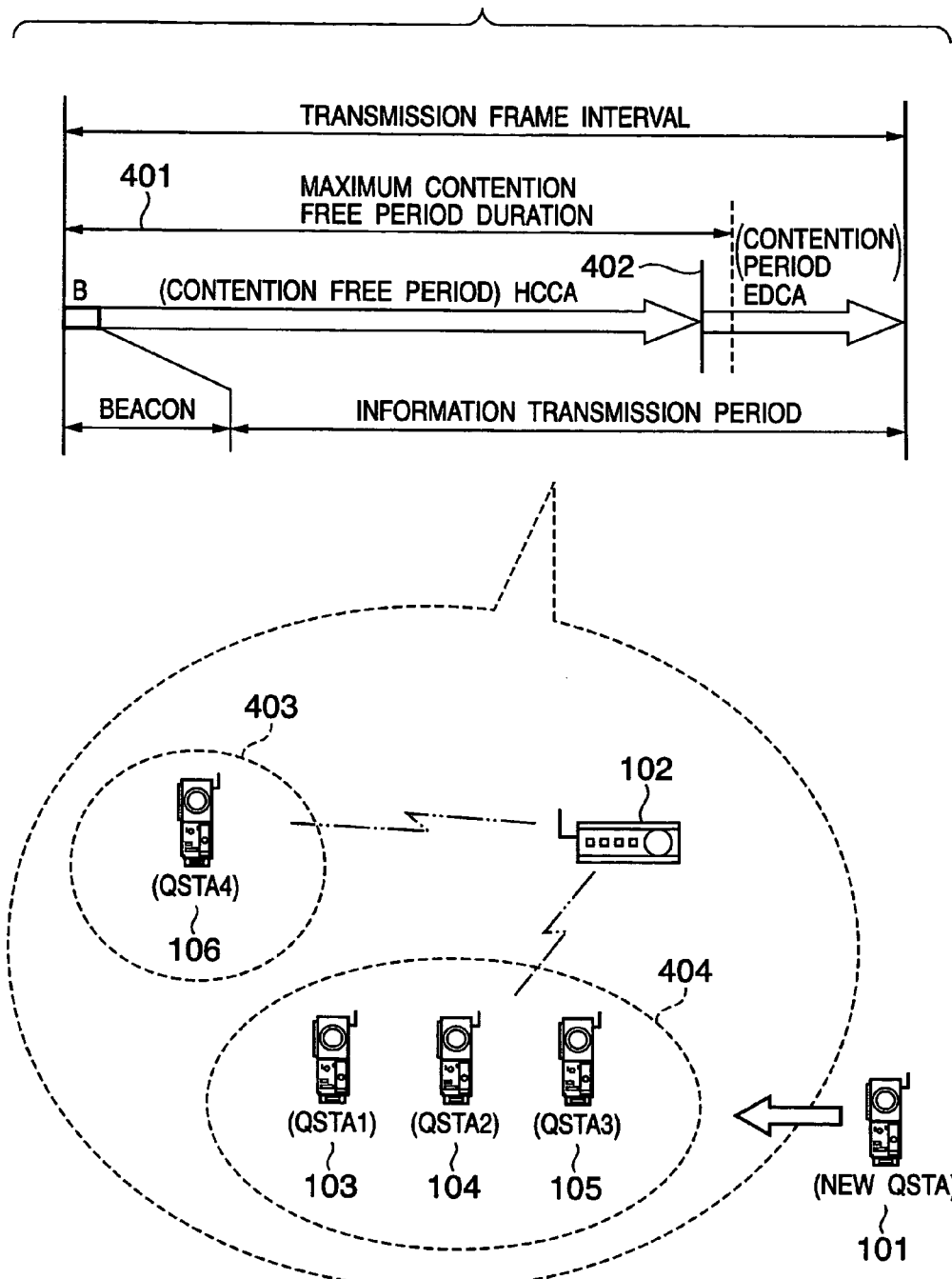
FIG. 4 is a view showing the first example of a model of a wireless LAN system according to the first embodiment of the present invention.

FIG. 4 is a view showing an example of a model of the wireless LAN system of this embodiment. Especially, FIG. 4 shows a "case in which many wireless terminal devices (clients) 103 to 105 which are activated by the HCCA access control method exist within the service area of the wireless video processing device 102". Note that FIG. 4 shows a model of the wireless LAN system shown in FIG. 1 and the format of the wireless LAN transmission frame shown in FIG. 3.

Referring to FIG. 4, reference numeral 401 denotes a maximum duration (maximum contention free period duration) of the bandwidth-reserved transmission period (CFP) 302 announced by the beacon information transmission period 301. Reference numeral 402 denotes a CF-END (a message indicating the end of duration of the bandwidth-reserved transmission period (CFP) 302) actually transmitted from the wireless video processing device 102. Reference numeral 403 denotes a group of the wireless terminal device 106 which is connected and accommodated by the wireless video processing device 102 based on the EDCA access control method. Reference numeral 404 denotes a group of the wireless terminal devices 103 to 105 which are connected and accommodated based on the HCCA access control method. Especially, in FIG. 4, the wireless terminal device 106 is an EDCA dedicated terminal. Also, the wireless terminal devices 103 to 105 are HCCA dedicated terminals. The wireless terminal device 101 comprises a hybrid function that supports the EDCA/HCCA dual access control method.

Figure 5:
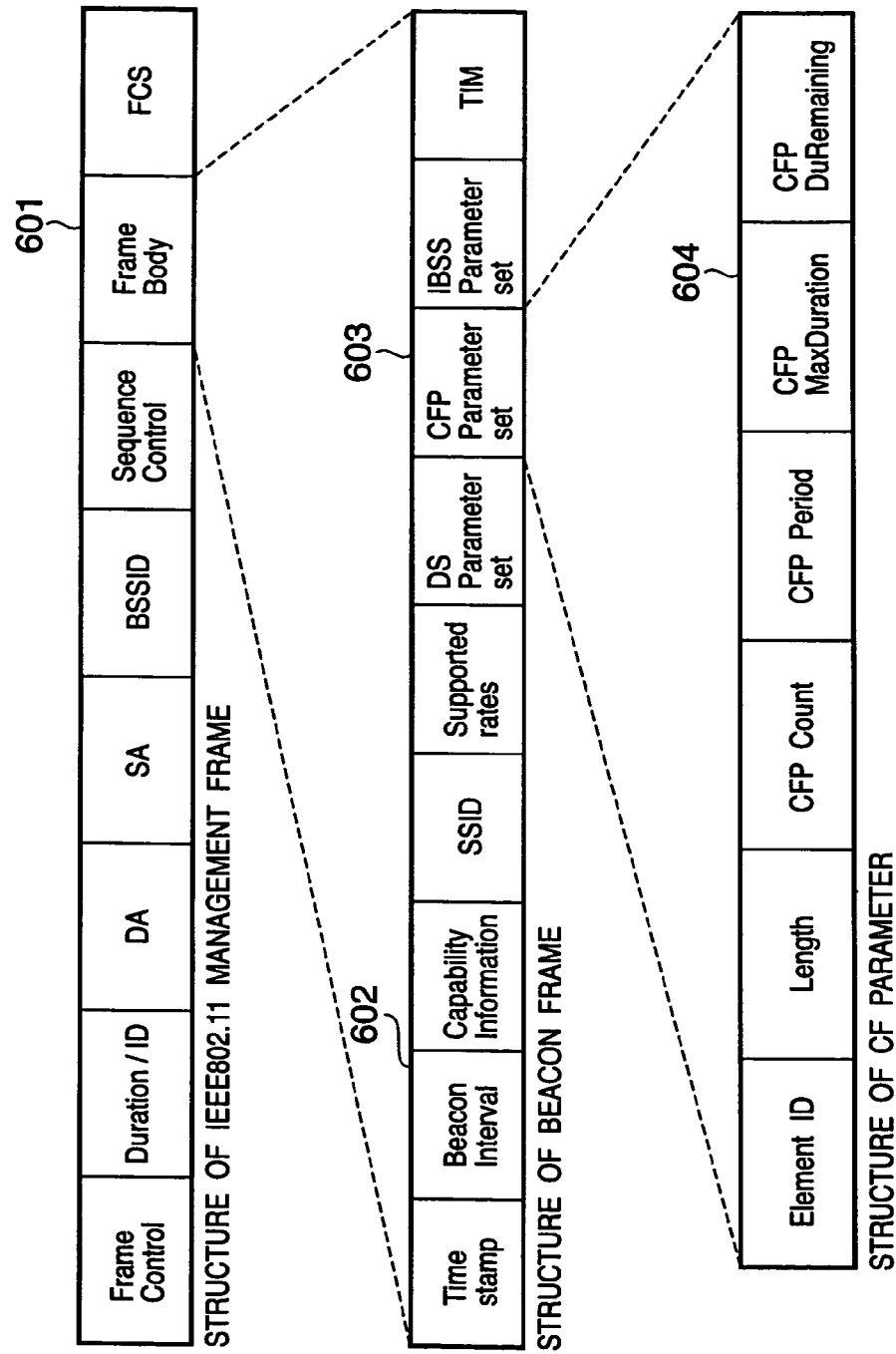
FIG. 5 shows an example of an IEEE 802.11 management frame data format according to the first embodiment of the present invention.

FIG. 5 shows an example of an IEEE 802.11 management frame data format. This data format includes a beacon frame used in this embodiment.

Referring to FIG. 5, frame data (frame body) 601 as a data area of the management frame indicates the structure of the beacon frame. A beacon interval 602 is a beacon frame interval T (µs) of the wireless LAN transmission frame format, which is formed by the first beacon information transmission period 301, bandwidth-reserved transmission period 302, and asynchronous information transmission period 303. A CF parameter set (CF parameter area) 603 is an area for setting information associated with the contention free period (CFP). A CFP max duration (CFP maximum duration) 604 is expressed by a maximum transmission duration P (µs) of the contention free period (CFP).

FIG. 6 shows an example of the configuration of an access control method determination table stored in the storage area unit 206 of each of the wireless terminal devices 101 and 103 to 106 according to this embodiment.

Referring to FIG. 6, reference numeral 701 denotes a CF-END average time S (µs) obtained by sampling a CF-END as an actual end message of the contention free period (CFP) a plurality of number of times, and averaging these CF-END messages. Reference numeral 702 denotes a first conditional formula expressed using the beacon frame interval (T) 602 and CFP max duration (P) 604. Reference numeral 703 denotes a second conditional formula expressed using the beacon frame interval (T) 602 and CF-END average time (S) 701.

Reference numeral 704 denotes a type (selection method) of access control method selected based on the results of the first and second conditional formulas 702 and 703. Note that selection methods E711 to E717 take as an example a case wherein the beacon frame interval (T) 602 is 10,000 (µs). The CFP max durations (P) 604 of these methods E711 to E717 are respectively 5,000, 5,000, 8,000, 8,000, 8,000, 3,000, and 3,000 (µs). Furthermore, the CF-END average times (S) 701 of these methods E711 to E717 are respectively 2,000, 5,000, 3,000, 5,000, 8,000, 3,000, and 1,000 (µs).

The wireless video transmission system of this embodiment will be described below.

Figure 7:
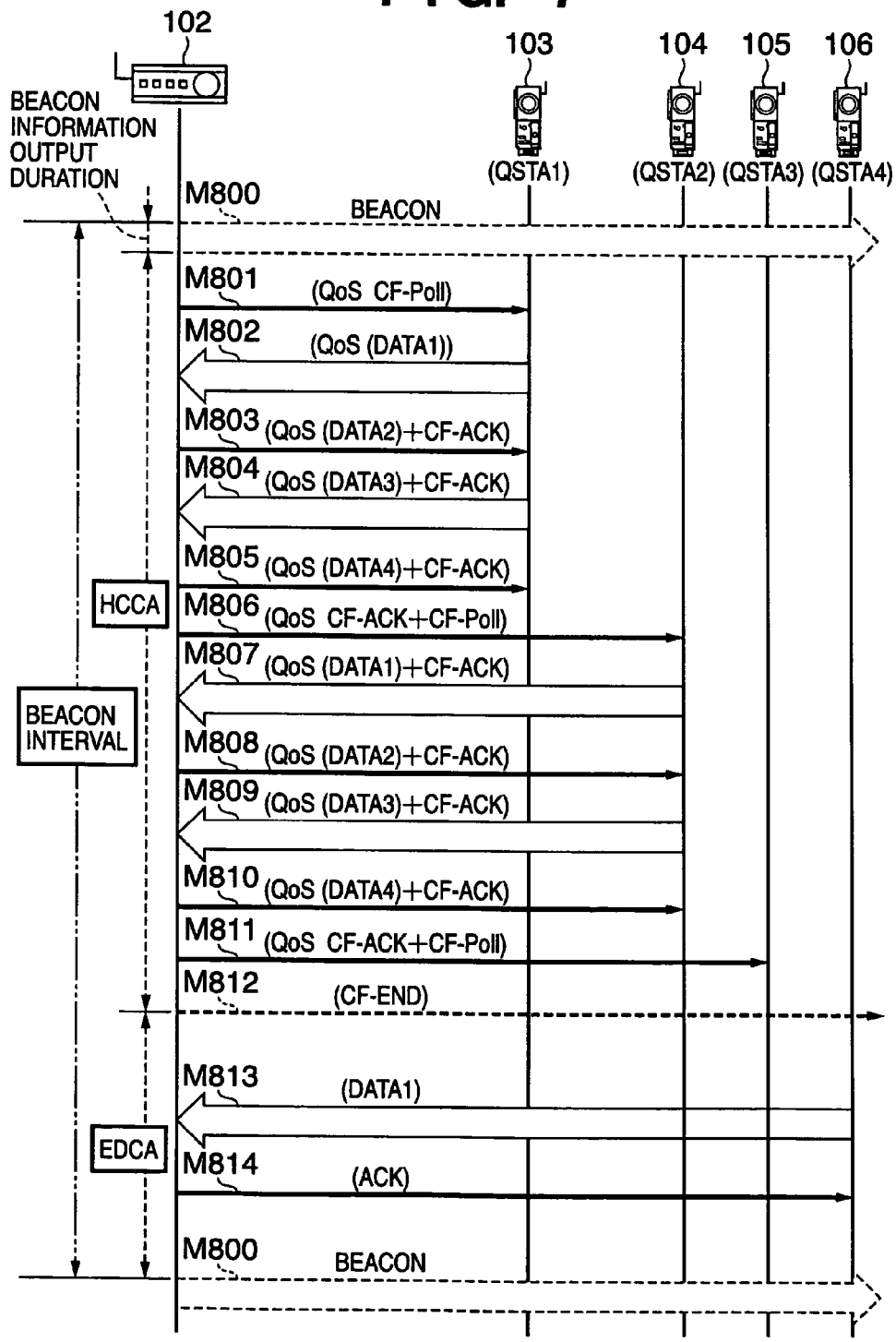
FIG. 7 is a sequence chart for explaining an example of a communication operation between a wireless video processing device and wireless terminal devices (QSTA1 to QSTA4) according to the first embodiment of the present invention.

FIG. 7 is a sequence chart for explaining an example of the communication operation between the wireless video processing device (QAP) 102 and wireless terminal devices (QSTA1 to QSTA4) 103 to 106. Note that each of the following sequence charts specifies only messages required upon explaining the embodiment of the present invention, and some of other basic messages are omitted.

When the beacon output timing is reached, the wireless video processing device (QAP) 102 sets the beacon frame interval (T) 602 and CFP max duration (P) 604. Then, the wireless video processing device 102 broadcasts a message M800 (beacon information) to the wireless terminal devices 103 to 106 within the service area.

Next, when the polling timing is reached during an HCCA (contention free period) duration, the wireless video processing device (QAP) 102 carries out polling (Qos CF-Poll) by transmitting a message M801 to the wireless terminal device (QSTA1) 103.

Upon reception of the message M801, the wireless terminal device (QSTA1) 103 sets transmission data to be transmitted to the wireless video processing device (QAP) 102 in a transmission buffer. Then, the wireless terminal device (QSTA1) 103 confirms the data transmission timing, and then transmits a message M802 to the wireless video processing device (QAP) 102.

Upon reception of the message M802, the wireless video processing device (QAP) 102 checks if a polling timing is reached. Furthermore, the wireless video processing device (QAP) 102 checks if transmission data such as ACK (Acknowledgment) or the like is set in a transmission buffer. If it is determined that the polling timing is not reached, and transmission data (e.g., ACK) is set in the transmission buffer, the wireless video processing device 102 transmits transmission data and a CF-ACK message to the wireless terminal device (QSTA1) 103 as a message M803.

Upon reception of the message M803, the wireless terminal device (QSTA1) 103 confirms the transmission timing of transmission data and a CF-ACK message, and then transmits them to the wireless video processing device (QAP) 102 as a message M804.

Upon reception of the message M804, the wireless video processing device (QAP) 102 transmits transmission data and a CF-ACK message to the wireless terminal device (QSTA1) 103 as a message M805 in the same manner as the aforementioned message M803.

As in the case of the wireless terminal device (QSTA1) 103, messages M806 to M810 are also exchanged with the wireless terminal device (QSTA2) 104 which is connected and accommodated in the wireless video processing device (QAP) 102.

Furthermore, the wireless video processing device (QAP) 102 transmits a message M811 to the wireless terminal device (QSTA3) 105 to execute polling. However, since there is no transmission data in case of the wireless terminal device (QSTA3) 105, data transmission is not made from the wireless terminal device (QSTA3) 105 to the wireless video processing device (QAP) 102.

In this way, upon completion of the contention free period (HCCA), the wireless video processing device (QAP) 102 sets a message M812 (CF-END 402) in the transmission buffer and transmits it within the service area.

After that, when a contention period (EDCA) is reached, the wireless terminal device (QSTA4) 106 sets transmission data to be transmitted to the wireless video processing device (QAP) 102 in a transmission buffer. The wireless terminal device (QSTA4) 106 confirms the data transmission timing, and then transmits a message M813 to the wireless video processing device (QAP) 102.

Upon reception of the message M813, the wireless video processing device (QAP) 102 immediately transmits a message M814 to the wireless terminal device (QSTA4) 106 as the transmission source of the message M813. Note that the message M814 includes, for example, transmission data such as ACK (Acknowledgment) or the like and a CF-ACK message.

Figure 8:
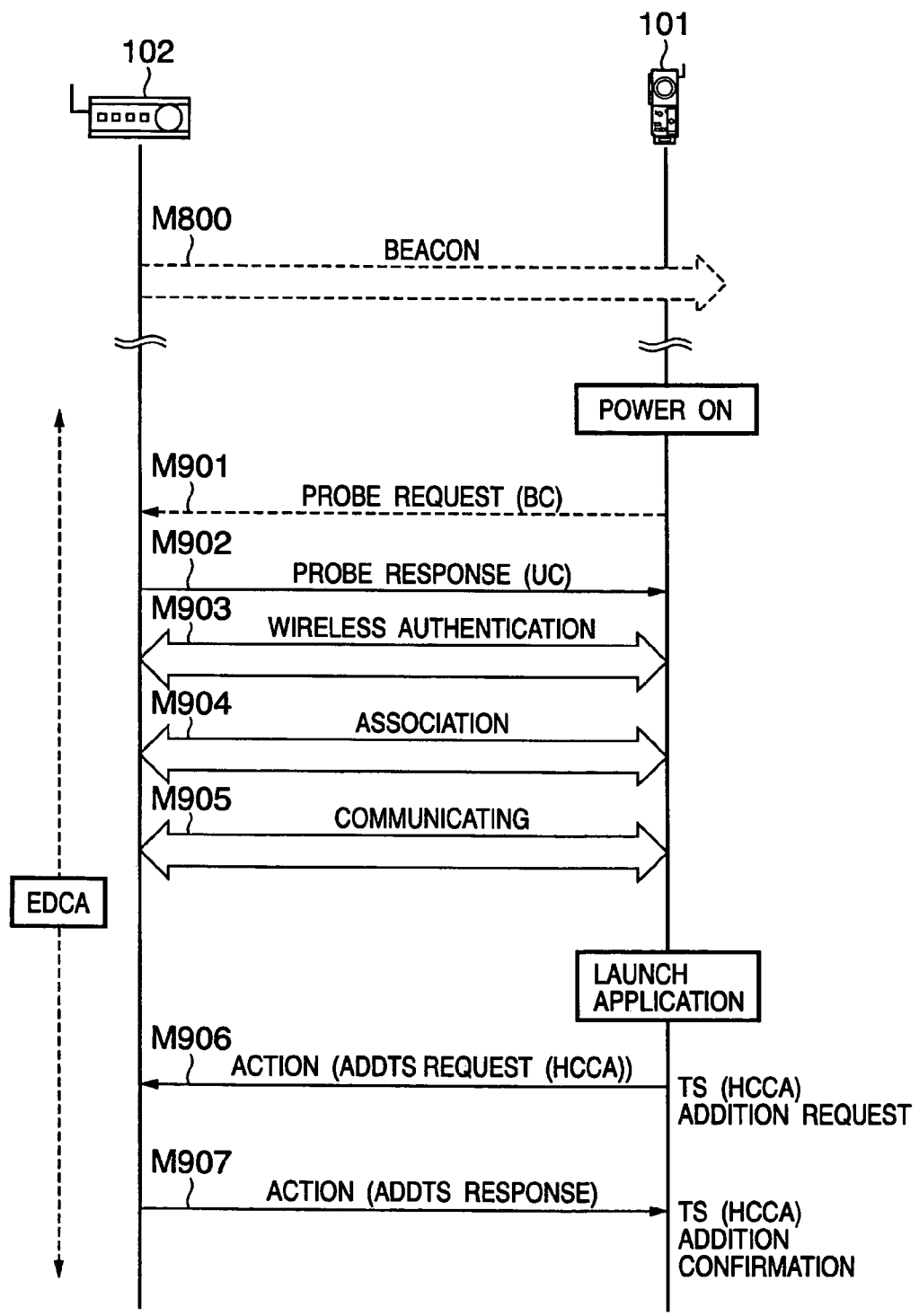
FIG. 8 is a sequence chart for explaining an example of a communication operation between the wireless video processing device and a new wireless terminal device (new QSTA) according to the first embodiment of the present invention.

An example of the communication operation between the wireless video processing device (QAP) 102 and wireless terminal device (new QSTA) 101 will be described below using the sequence chart of FIG. 8.

The wireless video processing device (QAP) 102 broadcasts the message M800 (beacon information).

After that, the power supply of the wireless terminal device (new QSTA) 101 is turned on (ON). The wireless terminal device (new QSTA) 101 broadcasts a message M901 as a probe request message so as to find out a wireless video processing device (wireless access point device) which can connect and accommodate the device 101.

Upon reception of this message M901, the wireless video processing device 102 unicasts a message M902 (probe response message) to the wireless terminal device 101.

The wireless video processing device (QAP) 102 and wireless terminal device (new QSTA) 101 exchange a message M903 to start authentication sequence processing and to activate an authentication processing completion timer.

Upon completion of the authentication sequence processing, the wireless video processing device (QAP) 102 and wireless terminal device (new QSTA) 101 exchange a message M904 to start association sequence processing. Also, an association processing completion timer is activated.

Upon completion of the association sequence processing, the wireless video processing device (QAP) 102 and wireless terminal device (new QSTA) 101 complete connection accommodation processing on a wireless link, and transit to a communicating state (communication processing of a message M905).

After the communicating state starts and an arbitrary communication application is launched by a user's operation or the like, the wireless terminal device (new QSTA) 101 transmits a message M906 to the wireless video processing device (QAP) 102. The message M906 is transmitted as a traffic stream (TS) addition request message. After the message M906 is transmitted, the device 101 further activates a TS addition response timer.

Upon reception of this message M906, the wireless video processing device (QAP) 102 transmits a message M907 to the wireless terminal device (new QSTA) 101 as a TS addition response message if it can provide a service. Furthermore, the device 102 adds, to a polling list, the wireless terminal device (new QSTA) 101 as a wireless terminal device which makes a data communication based on the HCCA access control method.

Figure 9:
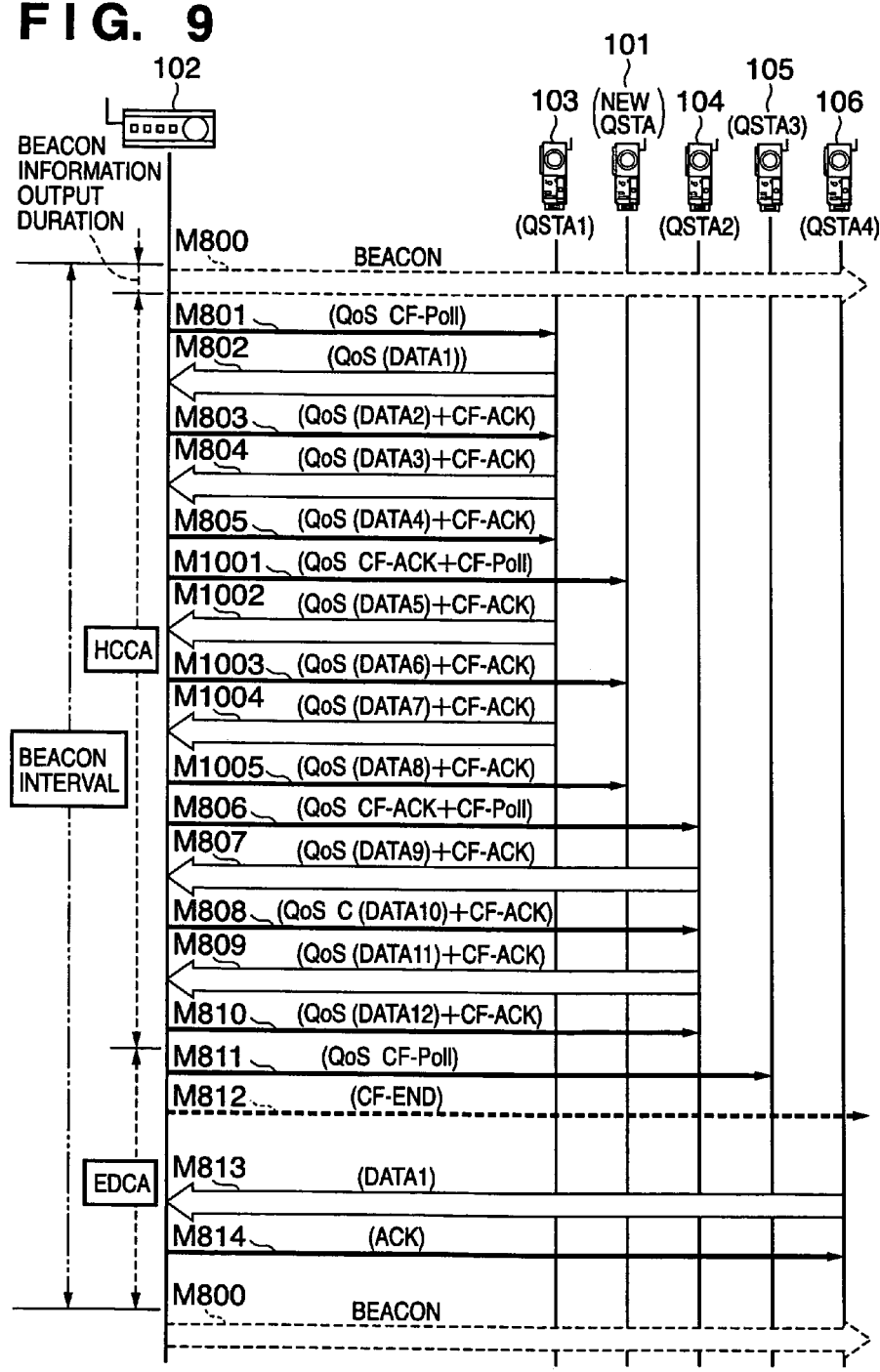
FIG. 9 is a sequence chart for explaining an example of a communication operation between the wireless video processing device and wireless terminal devices after completion of a TS addition request according to the first embodiment of the present invention.

An example of the communication operation between the wireless video processing device 102 and the wireless terminal devices 101 and 103 to 106 after completion of the TS addition request will be described below using the sequence chart of FIG. 9. Note that the following description will be given taking a case of the bandwidth requirement=TS×2 as an example.

The wireless video processing device (QAP) 102 broadcasts the message M800 (beacon information).

The wireless video processing device (QAP) 102 and wireless terminal device (QSTA1) 103 exchange the messages M801 to M805, as described above.

After that, if the polling timing is reached, the wireless video processing device (QAP) 102 transmits a message M1001 to the wireless terminal device (new QSTA) 101 to carry out polling (Qos CF-Poll).

Upon reception of the message M1001, if there is transmission data to be transmitted, the wireless terminal device (new QSTA) 101 sets that transmission data in a transmission buffer. After confirmation of the transmission timing of the transmission data, the wireless terminal device (new QSTA) 101 transmits the transmission data (message M1002) to the wireless video processing device (QAP) 102.

Upon reception of the message M1002, the wireless video processing device. (QAP) 102 transmits transmission data and a CF-ACK message to the wireless terminal device (new QSTA) 101 as a message M1003, after it confirms the transmission timing.

Upon reception of the message M1003, the wireless terminal device (new QSTA) 101 transmits transmission data and a CF-ACK message to the wireless video processing device (QAP) 102 as a message M1004, after it confirms the transmission timing.

Upon reception of the message M1004, the wireless video processing device (QAP) 102 transmits transmission data and a CF-ACK message to the wireless terminal device (new QSTA) 101 as a message M1005 in the same manner as the aforementioned message M1003.

After the message M1005 is transmitted to the wireless terminal device (new QSTA) 101, the wireless video processing device (QAP) 102 and wireless terminal devices (QSTA2 and QSTA3) 104 and 105 exchange messages M806 to M810.

Upon completion of the contention free period (HCCA) in this way, the wireless video processing device (QAP) 102 transmits the CF-END 402 as the message M812 within the service area.

When the contention period (EDCA) is reached, the wireless video processing device (QAP) 102 and wireless terminal device (QSTA4) 106 exchange the messages M813 and M814, as described above.

After that, the wireless video processing device (QAP) 102 broadcasts the message M800 (beacon information) again.

Figure 10:
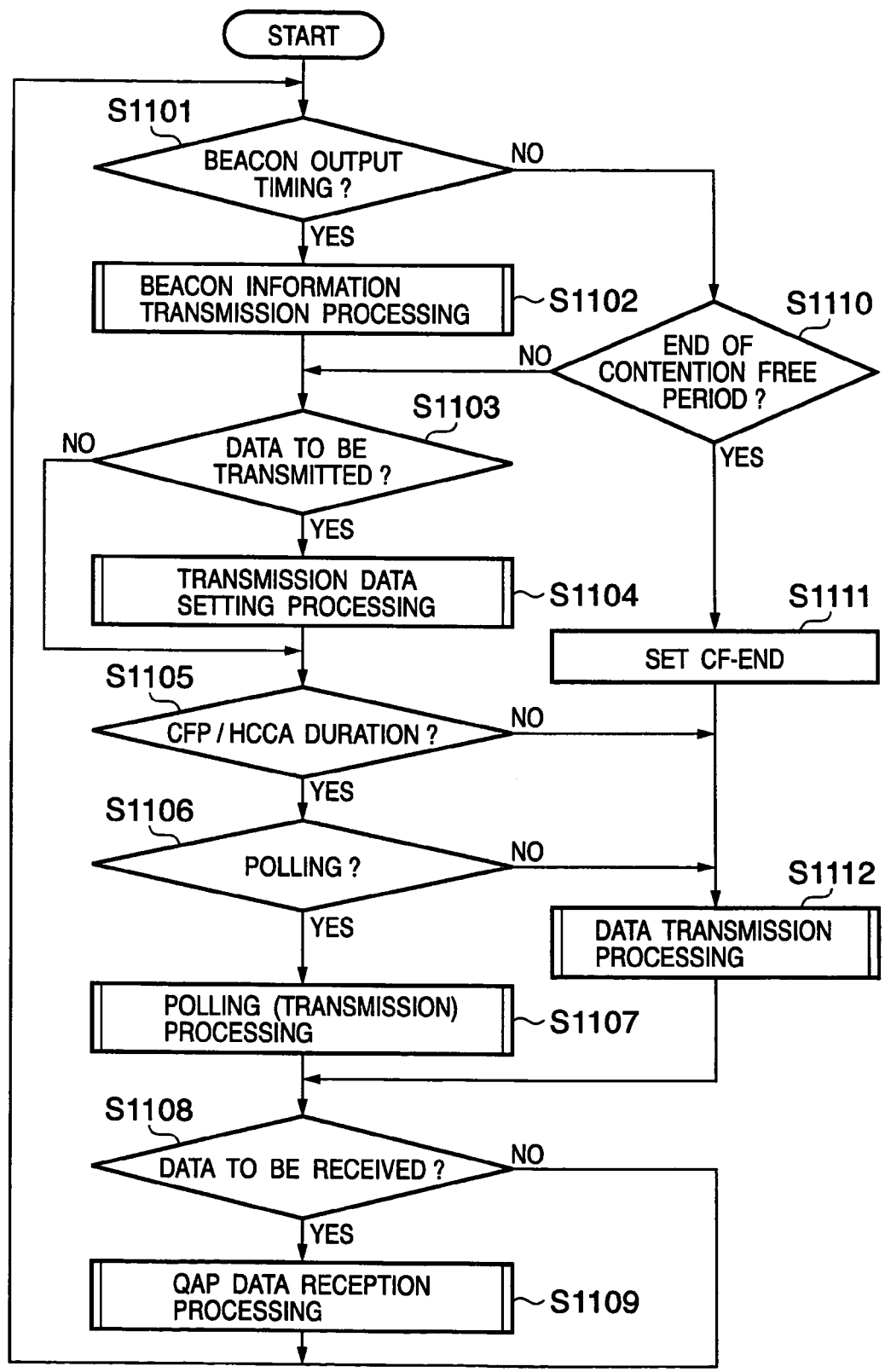
FIG. 10 is a flowchart for explaining an example of the processing operation of a wireless video processing device 102 according to the first embodiment of the present invention.

An example of the processing operation of the wireless video processing device 102 which performs the aforementioned communication operations will be described below with reference to the flowchart of FIG. 10.

The wireless video processing device 102 checks in step S1101 if the beacon output timing is reached. If it is determined as a result of checking that the beacon output timing is reached, the flow advances to step S1102, and the wireless video processing device 102 transmits the message M800 (beacon information) to the wireless terminal devices 101 and 103 to 106 within the service area.

The wireless video processing device 102 checks in step S1103 with reference to the polling list, which registers wireless terminal devices that perform data communications based on the HCCA access control method, if there is transmission data to be transmitted to the corresponding wireless terminal device. As a result of checking, if there is transmission data, the flow advances to step S1104., and the wireless video processing device 102 sets the transmission data in the transmission buffer. On the other hand, if there is no transmission data, the flow jumps to step S1105 by skipping step S1104.

The wireless video processing device 102 checks in step S1105 if an HCCA (contention free period) duration is reached. As a result of checking, if the HCCA (contention free period) duration is reached, the flow advances to step S1106, and the wireless video processing device 102 checks if the polling timing is reached. As a result of checking, if the polling timing is reached, the flow advances to step S1107, and the wireless video processing device 102 carries out polling (transmits the messages M801, M806, M811, and M1001) to the corresponding wireless terminal device.

The wireless video processing device 102 then checks in step S1108 if there is data to be received from the wireless terminal device. As a result of checking, if there is data to be received, the flow advances to step S1109 to receive data from the wireless terminal device. On the other hand, if there is no data to be received, the flow returns to the processing for checking whether or not the beacon output timing is reached (step S1101), and the wireless video processing device 102 then repeats steps S1101 to S1110.

If it is determined in step S1101 that the beacon output timing is not reached, the flow advances to step S1110 to check if the contention free period (HCCA) has reached an end. As a result of checking, if the contention free period (HCCA) has not reached an end, the flow advances to step S1103 to check if there is transmission data to be transmitted to the corresponding wireless terminal device.

On the other hand, if the contention free period (HCCA) has reached an end, the flow advances to step S1111 to set the CF-END 402 (message M812) in the transmission buffer, and to transmit the CF-END 402 within the service area in step S1112.

If it is determined in step S1105 that not the HCCA (contention free period) duration but the EDCA (contention period) duration is reached, the wireless video processing device 102 transmits transmission data to the corresponding wireless terminal device in step S1112. Also, if it is determined in step S1106 that the polling timing is not reached, the wireless video processing device 102 transmits transmission data to the corresponding wireless terminal device in step S1112.

Figure 11:
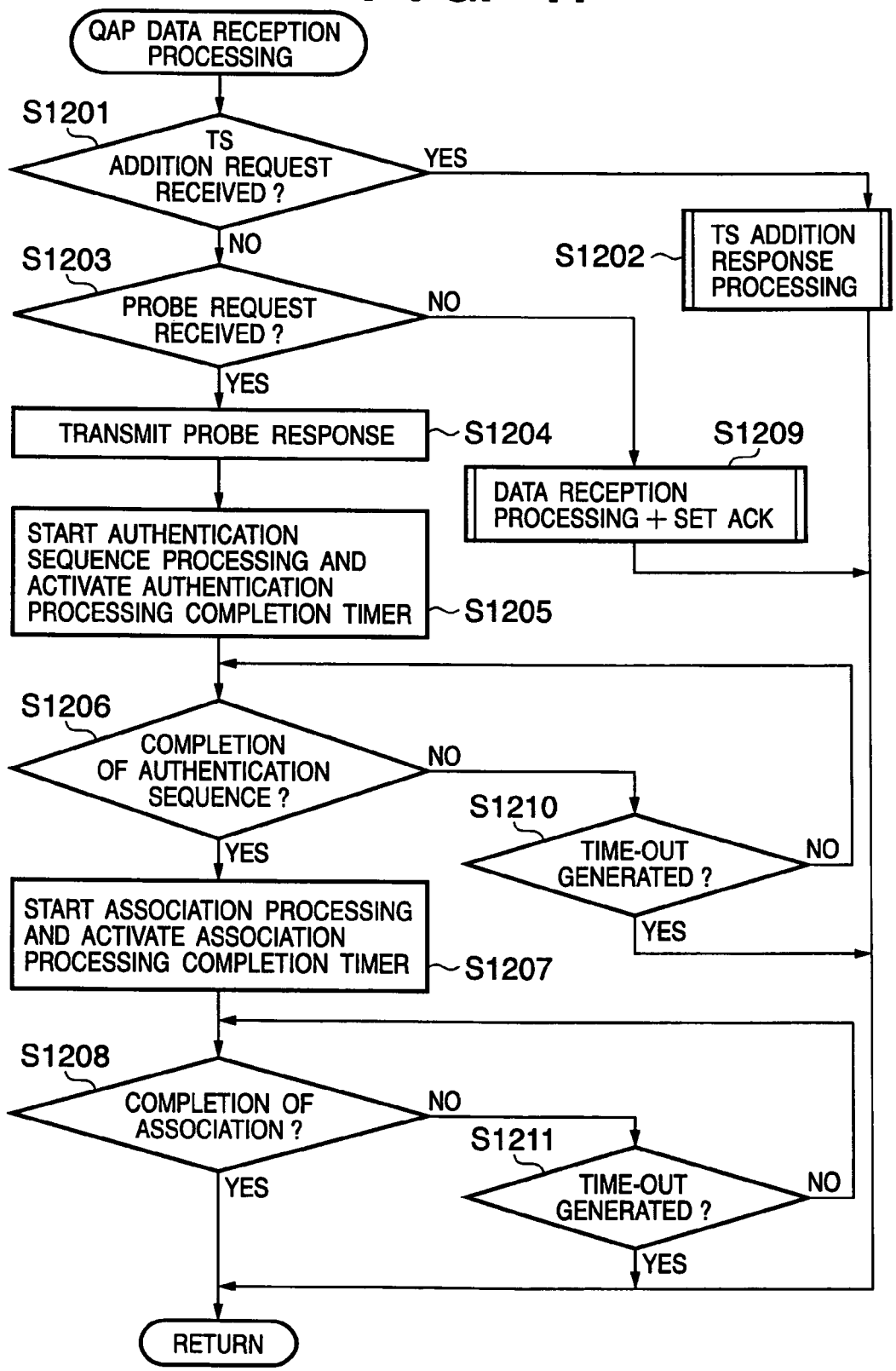
FIG. 11 is a flowchart for explaining details of an example of QAP data reception processing to be executed by the wireless video processing device according to the first embodiment of the present invention.

An example of the QAP data reception processing (step S1109) to be executed by the wireless video processing device 102 will be described in detail below with reference to the flowchart of FIG. 11.

The wireless video processing device 102 checks in step S1201 if the TS addition request message (message M906) is received. As a result of checking, if the TS addition request message (message M906) is received, the wireless video processing device 102 confirms the access control method (HCCA), type information (video), and bandwidth requirement (TS×3) in step S1202. As a result of confirmation, if a service can be provided, the wireless video processing device 102 transmits the TS addition response message (message M907) to the wireless terminal device (new QSTA) 101 to end the QAP data reception processing. The flow then returns to the flowchart of FIG. 10.

On the other hand, if the TS addition request message (message M906) is not received, the flow advances to step S1203 to check if the probe request message (message M901) is received. As a result of checking, if the probe request message (message M901) is received, the flow advances to step S1204 to unicast the probe response message (message M902) to the wireless terminal device 101.

In step S1205, the wireless video processing device 102 starts the authentication sequence processing (to transmit the message M903) and activates the authentication processing completion timer.

The wireless video processing device 102 checks in step S1206 if the authentication sequence processing (communication processing of the message M903) is complete. As a result of checking, if the authentication sequence processing is complete, the flow advances to step S1207. In step S1207, the wireless video processing device 102 starts the association sequence processing (communication processing of the message M904) with the wireless terminal device 101 and activates the association processing completion timer.

The wireless video processing device 102 checks in step S1208 if the association sequence processing is complete. As a result of checking, if the association sequence processing is complete, the wireless video processing device 102 ends the QAP data reception processing, and the control returns to the flowchart of FIG. 10.

If it is determined in step S1203 that normal data is received in place of the probe request message (message M901), the flow advances to step S1209. In step S1209, after completion of the reception processing, the wireless video processing device 102 sets ACK (Acknowledgment) in a given field of transmission data, and ends the QAP data reception processing. After that, the control returns to the flowchart of FIG. 10.

If it is determined in step S1206 that the authentication sequence processing is not complete yet, the flow advances to step S1210 to check if the authentication processing completion timer has reached an end (time-out is generated). As a result of checking, if the authentication processing completion timer has reached an end (time-out is generated), the wireless video processing device 102 ends the QAP data reception processing, and the control returns to the flowchart of FIG. 10.

If the authentication processing completion timer has not reached an end yet, the flow returns to step S1206 to check again if the authentication sequence processing is complete.

If it is determined in step S1208 that the association sequence processing is not complete yet, the flow advances to step S1211 to check if the association processing completion timer has reached an end (time-out is generated). As a result of checking, if the association processing completion timer has reached an end (time-out is generated), the wireless video processing device 102 ends the QAP data reception processing, and the control returns to the flowchart of FIG. 10.

On the other hand, if the association processing completion timer has not reached an end yet, the flow returns to step S1208 to check again if the association sequence processing is complete.

Figure 12:
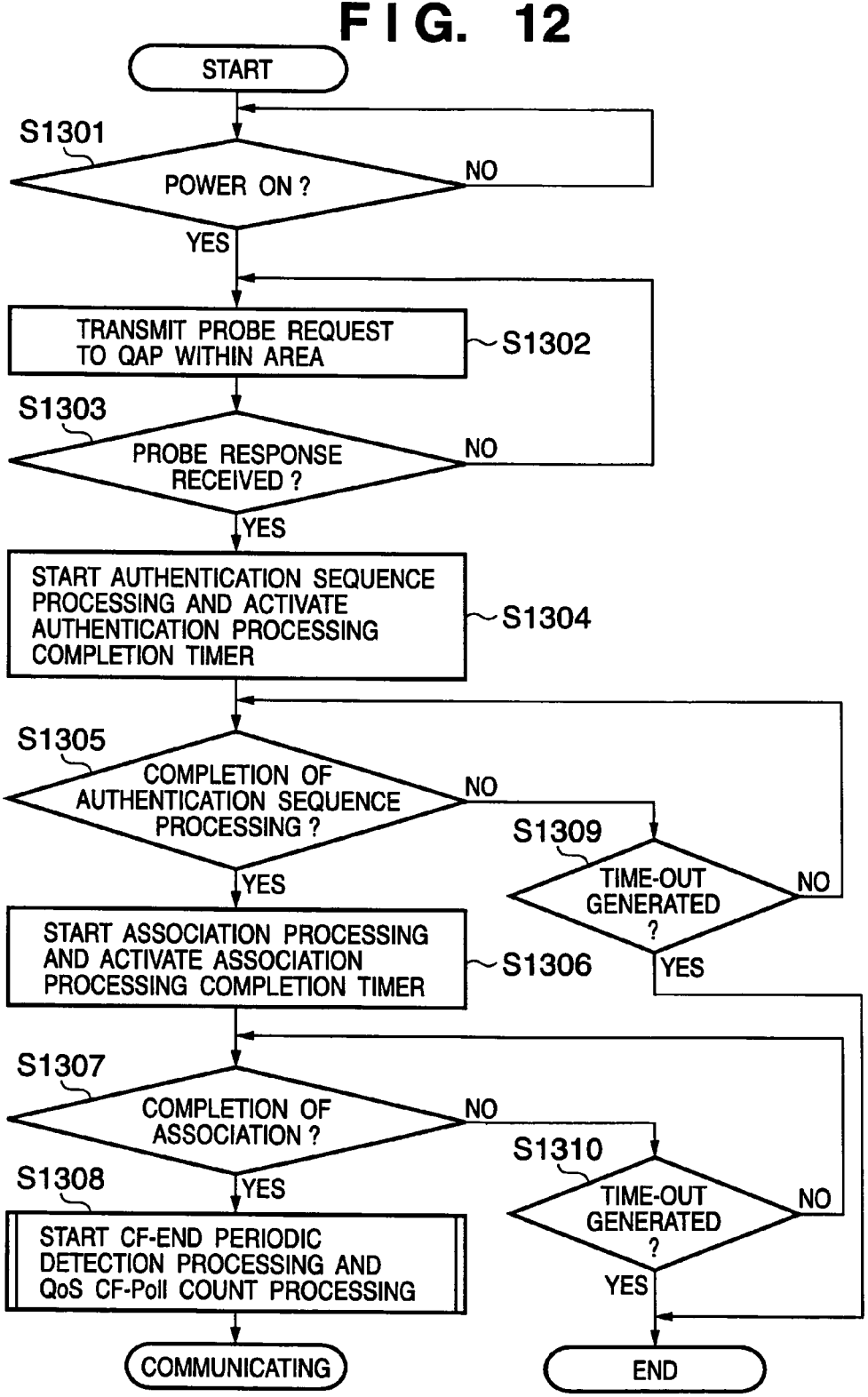
FIG. 12 is a flowchart for explaining an example of the processing operation of a wireless terminal device (new QSTA) according to the first embodiment of the present invention.

An example of the processing operation of the wireless terminal device (new QSTA) 101 will be described below with reference to the flowchart of FIG. 12.

In step S1301, the wireless terminal device 101 waits until its power supply is turned on (ON). After the power supply is ON, the flow advances to step S1302, and the wireless terminal device 101 broadcasts the probe request message (message M901). As described above, the probe request message is transmitted for the purpose of finding out a wireless access point device which can connect and accommodate the wireless terminal device.

The wireless terminal device 101 checks in step S1303 if the probe response message (message M902) is received. As a result of checking, if the probe response message (message M902) is not received, the flow returns to step S1302. The wireless terminal device 101 repeats steps S1302 and S1303 until it receives the probe response message (message M902).

After reception of the probe response message (message M902), the flow advances to step S1304, and the wireless terminal device 101 starts the authentication sequence processing (communication processing of the message M903) as in the wireless video processing device 102. Furthermore, the device 101 activates the authentication processing completion timer.

The wireless terminal device 101 checks in step S1305 if the authentication sequence processing (communication processing of the message M903) is complete. If the authentication sequence processing is complete, the flow advances to step S1306. In step S1306, the wireless terminal device 101 starts the association sequence processing (communication processing of the message M904) with the wireless video processing device 102, and activates the association processing completion timer.

The wireless terminal device 101 checks in step S1307 if the association sequence processing is complete. If the association sequence processing is complete, the flow advances to step S1308. In step S1308, the wireless terminal device 101 completes connection accommodation processing on a wireless link, executes CF-END periodic detection processing and QoS CF-Poll count processing, and transits to a communicating state (communication processing of the message M905).

If it is determined in step S1305 that the authentication sequence processing is not complete yet, the flow advances to step S1309. The wireless terminal device 101 checks in step S1309 if the authentication processing completion timer has reached an end (time-out is generated). If the authentication processing completion timer has reached an end (time-out is generated), the control is terminated as an error.

On the other hand, if the authentication processing completion timer has not reached an end, the flow returns to step S1305 to check if the authentication sequence processing is complete.

If it is determined in step S1307 that the association sequence processing is not complete yet, the flow advances to step S1310 to check if the association processing completion timer has reached an end (time-out is generated). As a result of checking, if the association processing completion timer has reached an end (time-out is generated), the control is terminated as an error.

On the other hand, if the association processing completion timer has not reached an end, the flow returns to step S1307 to check if the association sequence processing is complete.

Figure 13:
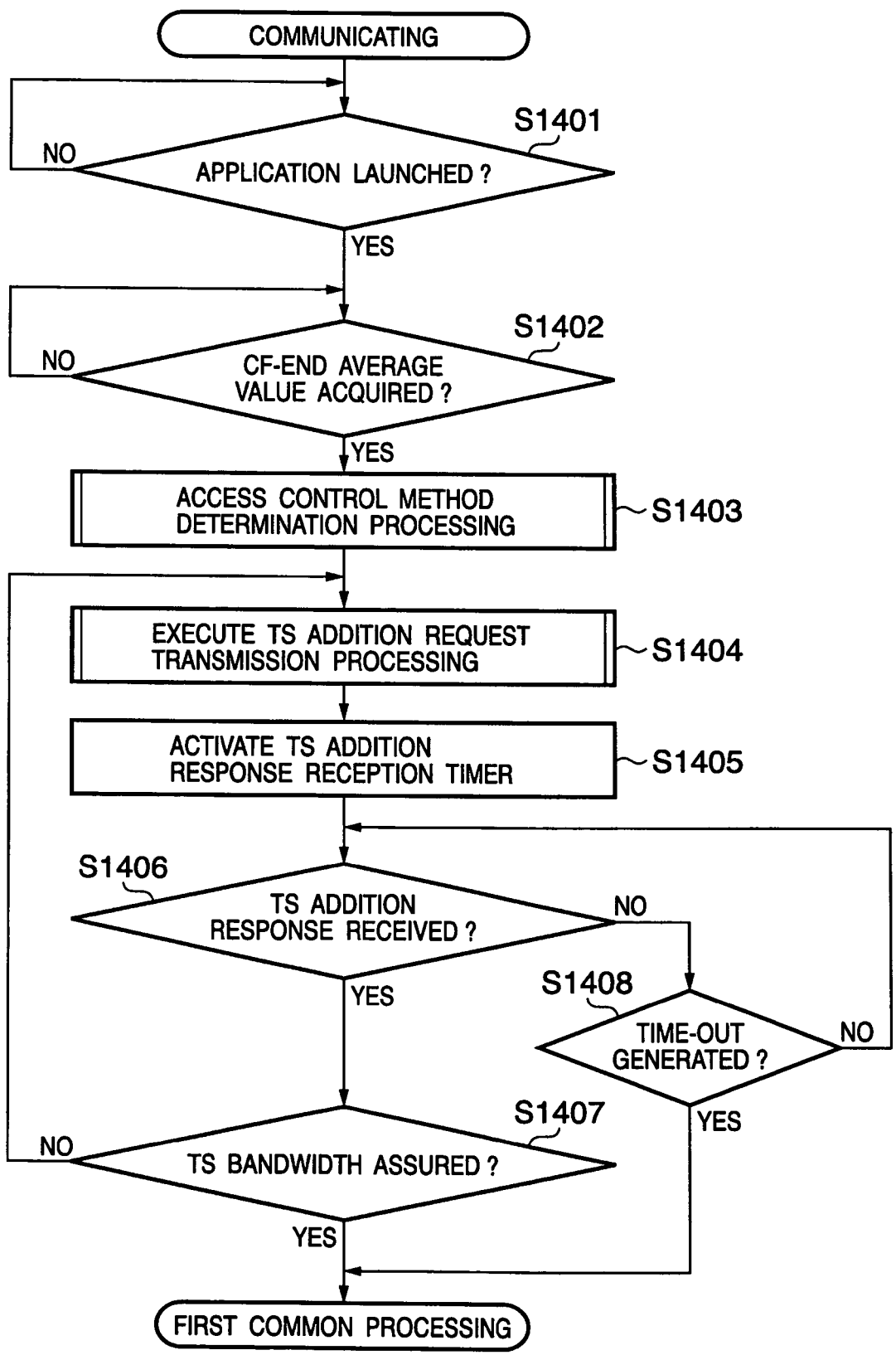
FIG. 13 is a flowchart for explaining an example of the processing operation of the wireless terminal device (new QSTA) upon issuing a TS addition request according to the first embodiment of the present invention.

An example of the processing operation of the wireless terminal device (new QSTA) 101 upon issuing the TS addition request after the control enters the communicating state (communication processing of the message M905) will be described below with reference to the flowchart of FIG. 13.

In step S1401, the wireless terminal device 101 waits until the communication application is launched by a user's operation or the like. After the communication application is launched, the flow advances to step S1402, and the wireless terminal device 101 waits until an actual CF-END average time (an average time of contention free periods (CFP)) 701 as the result of the CF-END periodic detection processing executed in step S1308 is acquired. Note that the CF-END average time 701 is the average of time periods in which the CF-END 402 is detected within a predetermined period of time including a plurality of transmission frames (each time period is defined from the beginning of a transmission frame until the CF-END 402 is detected).

After the CF-END average time 701 is acquired, the flow advances to step S1403, and the wireless terminal device 101 executes access control method determination processing. Details of the access control method determination processing will be described later using FIG. 15.

In step S1404, the wireless terminal device 101 executes TS addition request transmission processing by an access control method selected as a result of the access control method determination processing. For example, a case will be examined below wherein the HCCA access control method (E715) shown in FIG. 6 is selected as a result of the access control method determination processing in step S1403. In this case, in this TS addition request transmission processing, the wireless terminal device 101 transmits a TS addition request message (message M906) including the access control method (HCCA), type information (video), and bandwidth requirement (TS×3) to the wireless video processing device 102.

In step S1405, the wireless terminal device 101 activates a TS addition response timer.

The wireless terminal device 101 checks in step S1406 if the TS addition response message (message M907) is received. As a result of checking, if the TS addition response message (message M907) is received, the flow advances to step S1407 to interpret that TS addition response message and to check based on the interpretation result if the TS bandwidth can be assured.

Figure 14:
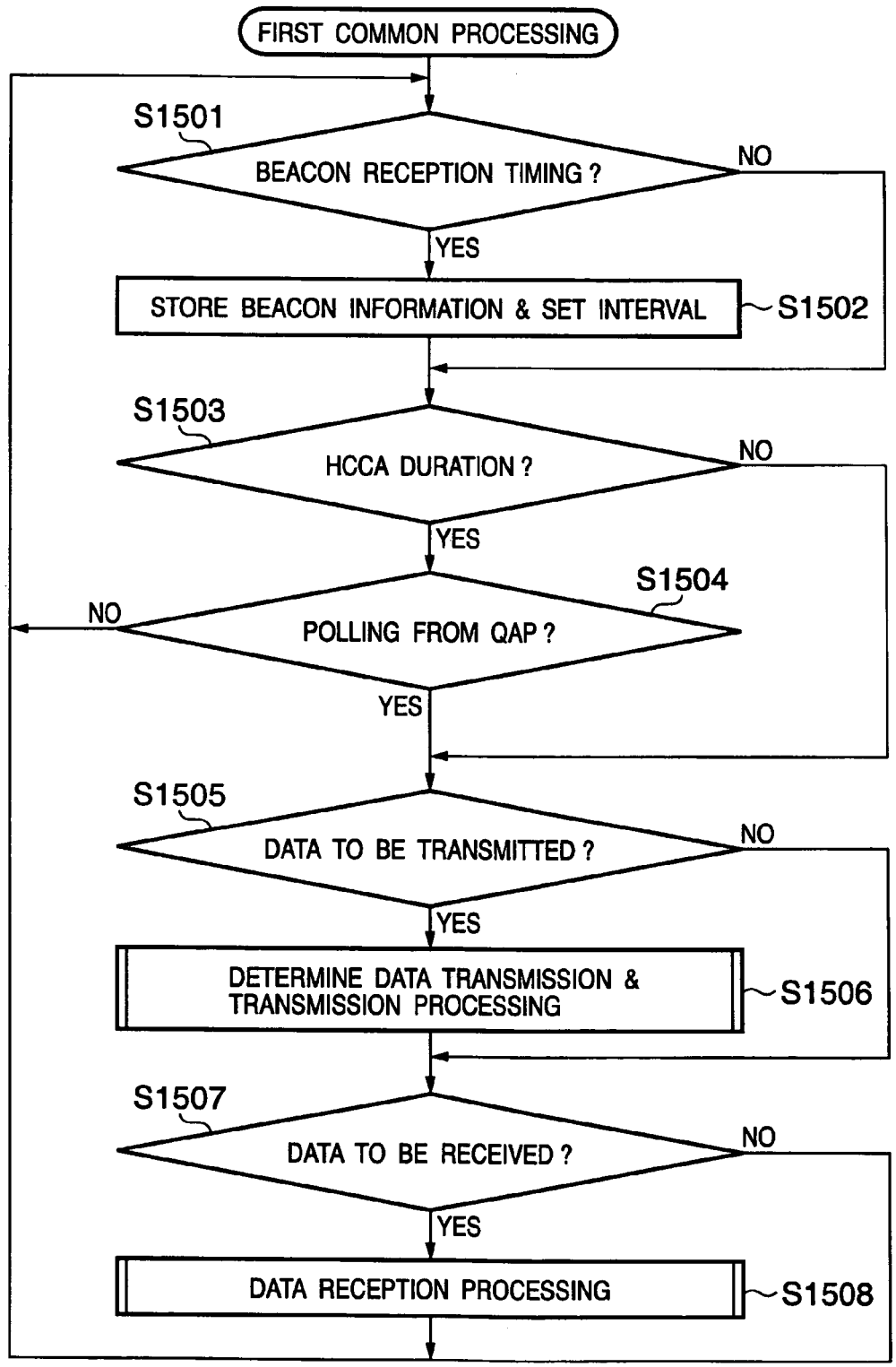
FIG. 14 is a flowchart for explaining an example of the processing operation of the wireless terminal device (new QSTA), which follows FIG. 13, according to the first embodiment of the present invention.

As a result of checking, if the TS bandwidth can be assured, the control advances to the flowchart (first common processing) of FIG. 14. On the other hand, if the TS bandwidth cannot be assured, the wireless terminal device 101 decreases the bandwidth requirement (TS×2), and repeats the processing in step S1404 and subsequent steps. If a minimum bandwidth requirement (TS×1) cannot be assured, the wireless terminal device 101 changes the access control method and repeats the processing in step S1404 and subsequent steps.

If it is determined in step S1406 that no TS addition response message (message M907) is received, the flow advances to step S1408. The wireless terminal device 101 checks in step S1408 if the TS addition response timer has reached an end (time-out is generated). If the TS addition response timer has reached an end (time-out is generated), the flow advances to the flowchart (first common processing) of FIG. 14.

On the other hand, if the TS addition response timer has not reached an end yet (time-out is not generated), the flow returns to step S1406 to check again if the TS addition response message (message M907) is received.

After the flow advances to step S1501 in the flowchart of FIG. 14, the wireless terminal device 101 checks if the reception timing of the beacon information (message M800) is reached. As a result of checking, if the reception timing of the beacon information (message M800) is reached, the wireless terminal device 101 receives the beacon information (message M800) from the wireless video processing device (QAP) 102 in step S1502.

The wireless terminal device 101 stores the beacon frame interval (T) 602 and CFP max duration (P) 604 included in the received beacon information (message M800) in an access control method determination table in the storage area unit 206. The wireless terminal device 101 sets the beacon frame interval (T) 602 in a counter of beacon confirmation processing to determine this timing the next time.

On the other hand, if the reception timing of the beacon information (message M800) is not reached, the flow jumps to step S1503 by skipping step S1502.

The wireless terminal device 101 checks in step S1503 if an HCCA (contention free period) duration is reached. As a result of checking, if the HCCA (contention free period) duration is reached, the flow advances to step S1504 to check if polling from the wireless video processing device (QAP) 102 is done. As a result of checking, if polling is done, the flow advances to step S1505 to check if there is data to be transmitted to the wireless video processing device (QAP) 102. As a result of checking, if there is data to be transmitted, the flow advances to step S1506 to set the data to be transmitted in the transmission buffer. After confirmation of the data transmission timing, the wireless terminal device 101 transmits the data (e.g., messages M1002 and M1004) to the wireless video processing device (QAP) 102.

On the other hand, if there is no data to be transmitted, the flow skips step S1506 and jumps to step S1507. The wireless terminal device 101 checks in step S1507 if there is data (e.g., messages M1003 and M1005) to be received from the wireless video processing device (QAP) 102. As a result of checking, if there is data to be received from the wireless video processing device (QAP) 102, the flow advances to step S1508 to execute processing for receiving data from the wireless video processing device (QAP) 102.

If it is determined in step S1503 that the HCCA (contention free period) duration is not reached, the flow jumps to step S1505 by skipping step S1504.

As described above, the wireless video processing device (QAP) 102 accepts the TS addition request processing based on the HCCA access control method from the wireless terminal device (new QSTA) 101. Then, the wireless video processing device (QAP) 102 registers the wireless terminal device 101 in the polling list together with the wireless terminal devices (QSTA1 to QATA3) 103, 104, and 105, and executes the access control processing in the contention free period. Furthermore, the wireless video processing device 102 performs access control of the wireless terminal device (QSTA4) 106 which supports the EDCA access control method in the contention period.

Figure 15:
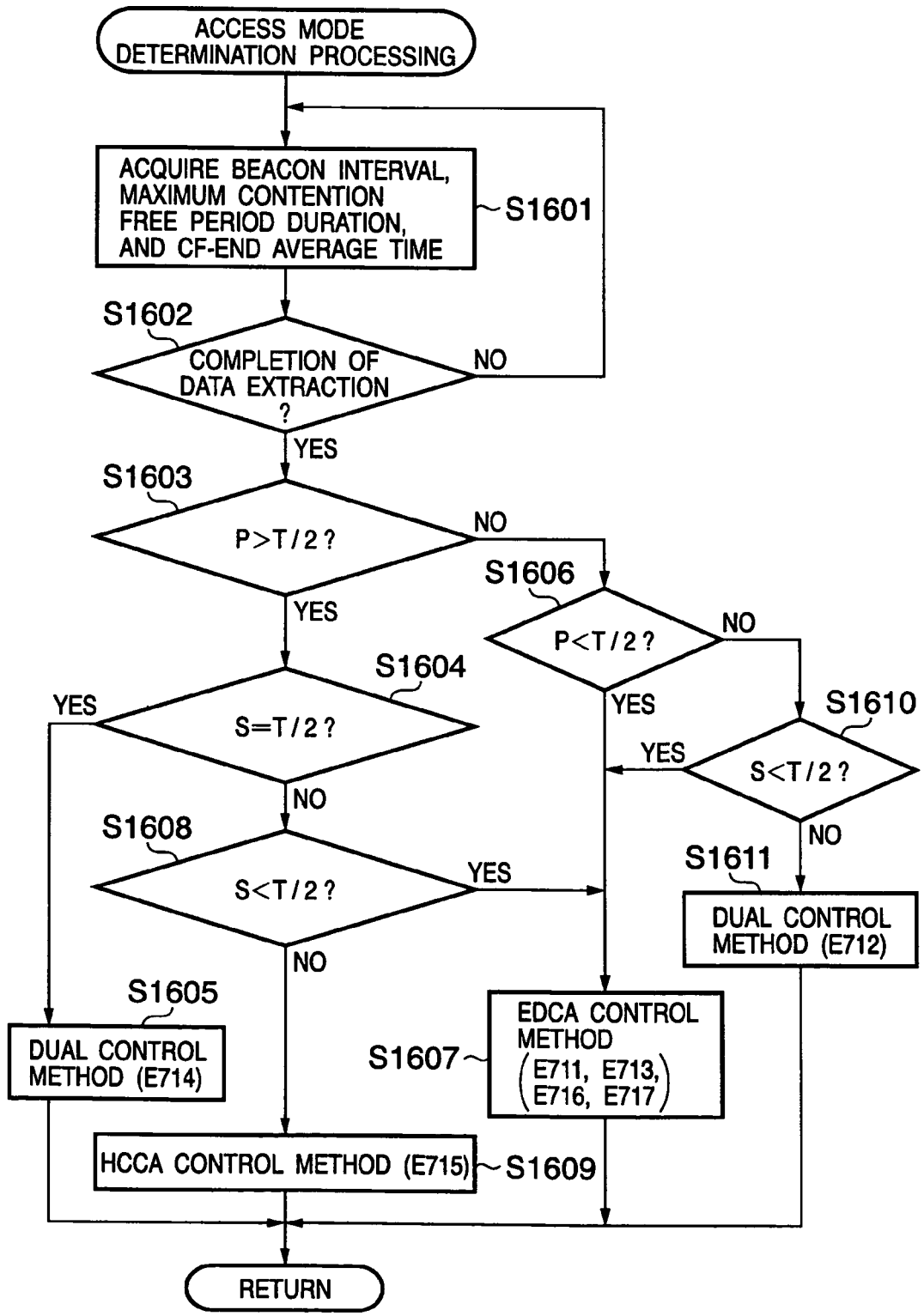
FIG. 15 is a flowchart for explaining details of an example of access control method determination processing according to the first embodiment of the present invention.

An example of the access control method determination processing in step S1403 in FIG. 13 will be described below with reference to the flowchart of FIG. 15.

The wireless terminal device acquires the beacon frame interval (T) 602 and CFP max duration (P) 604 from the beacon information (message M800) announced from the wireless video processing device 102 in step S1601.

The wireless terminal device checks in step S1602 if extraction of data associated with the CF-END average time (S) 701 is complete. As a result of checking, if extraction of data associated with the CF-END average time (S) 701 is not complete yet, the wireless terminal device repeats steps S1601 and S1602 until it is completed.

In steps S1603 to S1611, the wireless terminal device selects the access control method based on a first conditional formula 702 and second conditional formula 703. Note that the beacon frame interval (T) 602, CFP max duration (P) 604, and CF-END average time (S) 701 are used upon selection.

More specifically, the wireless terminal device checks in step S1603 if the first conditional formula 702 satisfies P>T/2. As a result of checking if the first conditional formula 702 satisfies P>T/2, the flow advances to step S1604 to check if the second conditional formula 703 satisfies S=T/2. As a result of checking if the second conditional formula 703 satisfies S=T/2, the flow advances to step S1605 to select the HCCA/EDCA dual access control method (E714). That is, the wireless terminal device selects the operation corresponding to the HCCA/EDCA dual control method.

If it is determined in step S1604 that the second conditional formula 703 does not satisfy S=T/2, the flow advances to step S1608 to check if the second conditional formula 703 satisfies S<T/2. As a result of checking, if the second conditional formula 703 satisfies S<T/2, the flow advances to step S1607 to select the EDCA access control method (E713). On the other hand, if the second conditional formula 703 does not satisfy S<T/2, the flow advances to step S1609 to select the HCCA access control method (E715).

If it is determined in step S1603 that the first conditional formula 702 does not satisfy P>T/2, the wireless terminal device checks in step S1606 if the first conditional formula 702 satisfies P<T/2. As a result of checking, if the first conditional formula 702 satisfies P<T/2, the flow advances to step S1607 to select the EDCA method (E716, E717).

If it is determined in step S1606 that the first conditional formula 702 does not satisfy P<T/2, the flow advances to step S1610 to check if the second conditional formula 703 satisfies S<T/2. As a result of checking, if the second conditional formula 703 satisfies S<T/2, the flow advances to step S1607 to select the EDCA method (E711). On the other hand, if the second conditional formula 703 does not satisfy S<T/2, the flow advances to step S1611 to select the HCCA/EDCA dual access control method (E712).

As described above, according to this embodiment, the wireless terminal device 101 interprets information transmitted from the wireless video processing device 102, autonomously selects an optimal access control method, and requests the wireless video processing device 102. In this way, the QoS function on the initiative of the wireless terminal device 101 can be implemented, thus improving the QoS function.

The wireless terminal device 101 interprets the access control states associated with the plurality of wireless terminal devices 103 to 106 within the service area provided by the wireless video processing device 102 in a communication state after the wireless link is established. The wireless terminal device 101 launches the TS addition request processing using the access control method which is determined to be suited to itself. For this reason, the probability of receiving an access control method change instruction or the like from the wireless vide processing device 102 can be reduced. Hence, a time required to assure the transmission bandwidth by the wireless terminal device 101 can be shortened.

Second Embodiment

A wireless video transmission system according to the second embodiment of the present invention will be described below. In the first embodiment, the TS addition request is issued in the communication state. However, in this embodiment, the TS addition request is issued during the association processing and communication processing. In this manner, the issuance timing of the TS addition request of this embodiment is mainly different from the first embodiment. Hence, in the description of this embodiment, a detailed description of the same parts as those in the first embodiment will be omitted as needed.

Figure 16:
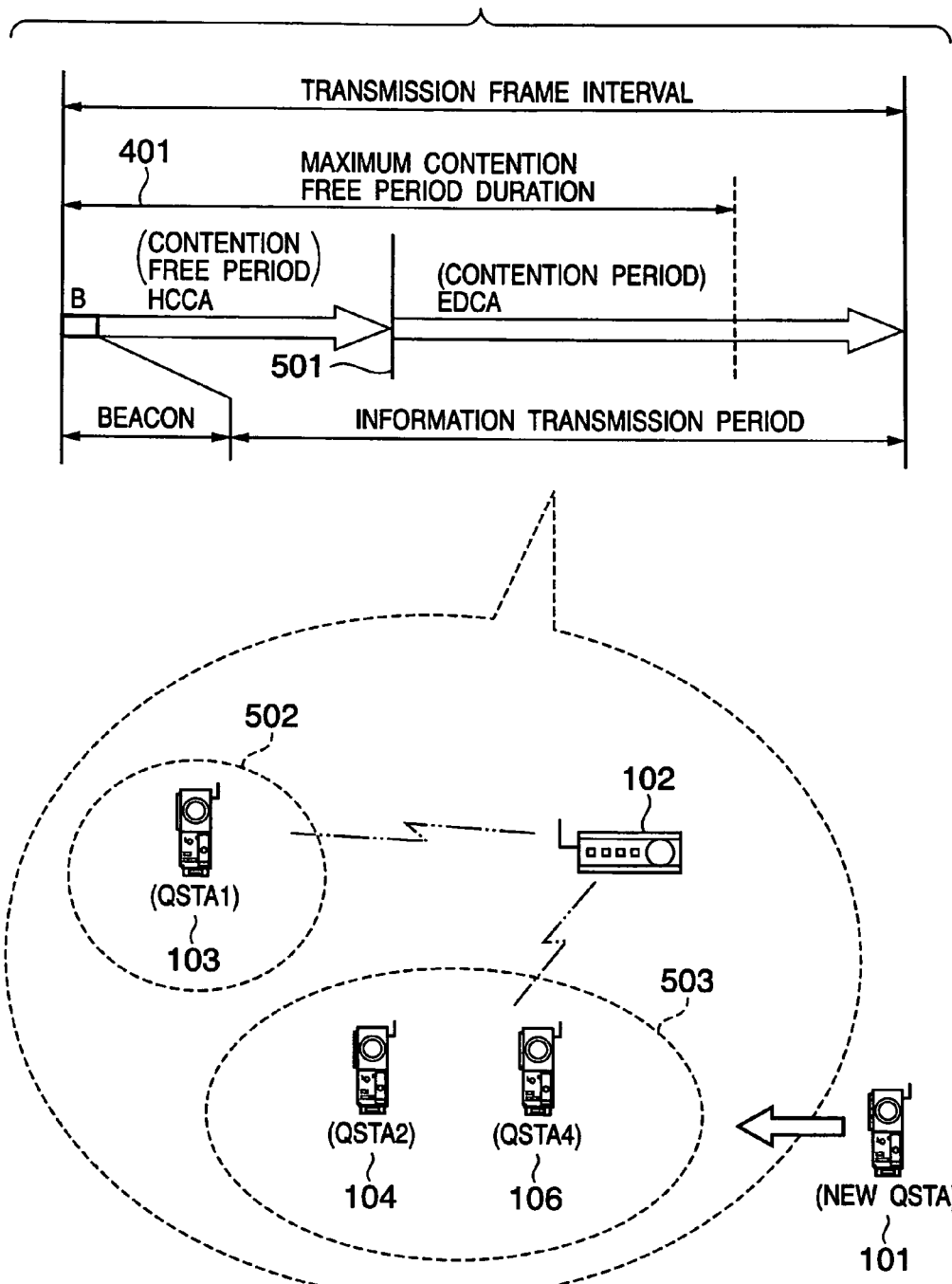
FIG. 16 is a view showing an example of a model of a wireless LAN system according to the second embodiment of the present invention.

FIG. 16 shows an example of a model of a wireless LAN system according to this embodiment. Especially, FIG. 16 shows a "case in which many wireless terminal devices (clients) 104 and 106 which are activated by the EDCA access control method exist within the service area of the wireless video processing device 102". Note that FIG. 16 shows a model of the wireless LAN system shown in FIG. 1 and the format of the wireless LAN transmission frame shown in FIG. 3.

Referring to FIG. 16, reference numeral 501 denotes a CF-END which is actually transmitted by the wireless video processing device 102. Reference numeral 502 denotes a group of the wireless terminal device 103 which is connected and accommodated by the HCCA access control method. Reference numeral 503 denotes a group of the wireless terminal devices 104 and 106 which are connected and accommodated by the EDCA access control method. Especially, in FIG. 16, the wireless terminal devices 104 and 106 are EDCA dedicated terminals. The wireless terminal device 103 is an HCCA dedicated terminal. The wireless terminal device 101 has the hybrid function of the EDCA/HCCA dual access control method.

Figure 17:
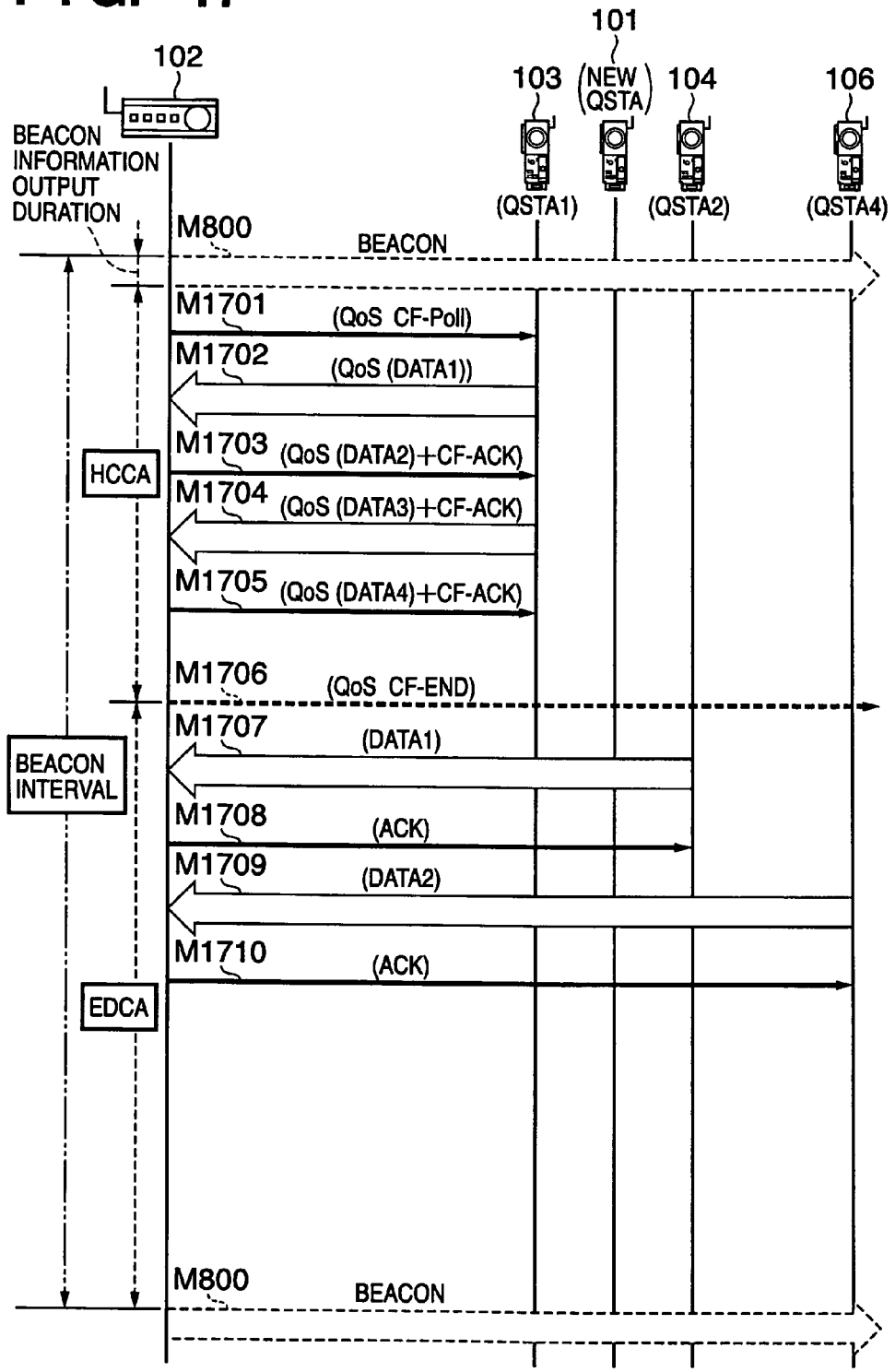
FIG. 17 is a sequence chart for explaining an example of a communication operation between a wireless video processing device and wireless terminal devices (QSTA1, QSTA2, and QSTA4) according to the second embodiment of the present invention.

FIG. 17 is a sequence chart for explaining an example of the communication operation between the wireless video processing device (QAP) 102 of this embodiment, and the wireless terminal devices (QSTA1, QSTA2, and QSTA4) 103, 104, and 106 of this embodiment.

Referring to FIG. 17, when the beacon output timing is reached, the wireless video processing device (QAP) 102 broadcasts the message M800 (beacon information).

Next, the wireless video processing device (QAP) 102 checks with reference to a polling list which registers wireless terminal devices that make data communications based on the HCCA access control method if there is data to be transmitted to the corresponding wireless terminal device. Then, the device 102 sets data to be transmitted in the transmission buffer.

If the polling timing is reached during the HCCA (contention free period) duration, wireless video processing device (QAP) 102 transmits a message M1701 to the wireless terminal device (QSTA1) 103, thus carrying out polling (Qos CF-Poll).

Upon reception of the message M1701, the wireless terminal device (QSTA1) 103 sets transmission data to be transmitted to the wireless video processing device (QAP) 102 in the transmission buffer. Then, after confirmation of the data transmission timing, the wireless terminal device (QSTA1) 103 transmits that data (message M1702) to the wireless video processing device (QAP) 102.

Upon reception of the message M1702, the wireless video processing device (QAP) 102 checks if a polling timing is reached. Furthermore, the wireless video processing device (QAP) 102 checks if transmission data such as ACK (Acknowledgment) or the like is set in the transmission buffer. If it is determined that the polling timing is not reached, and transmission data (e.g., ACK) is set in the transmission buffer, the wireless video processing device 102 transmits transmission data and a CF-ACK message to the wireless terminal device (QSTA1) 103 as a message M1703.

Upon reception of the message M1703, the wireless terminal device (QSTAL) 103 transmits transmission data and a CF-ACK message to the wireless video processing device (QAP) 102 as a message M1704, after confirmation of the transmission timing.

Upon reception of the message M1704, the wireless video processing device (QAP) 102 transmits transmission data and a CF-ACK message to the wireless terminal device (QSTA1) 103 as a message M1705 in the same manner as the aforementioned message M1703.

In this way, upon completion of the contention free period (HCCA), the wireless video processing device (QAP) 102 sets a message M1706 (CF-END 501) in the transmission buffer and transmits it within the service area.

After that, when a contention period (EDCA) is reached, the wireless terminal device (QSTA2) 104 sets transmission data to be transmitted to the wireless video processing device (QAP) 102 in the transmission buffer. The wireless terminal device (QSTA2) 104 transmits a message M1707 to the wireless video processing device (QAP) 102 after confirmation of the data transmission timing.

Upon reception of the message M1707, the wireless video processing device (QAP) 102 immediately transmits a message M1708 to the wireless terminal device (QSTA2) 104 as the transmission source of the message M1707. Note that the message M1708 includes, for example, transmission data such as ACK (Acknowledgment) or the like and a CF-ACK message.

As in the wireless terminal device (QSTA2) 104, messages M1709 and M1710 are exchanged with the wireless terminal device (QSTA4) 106 which is connected and accommodated in the wireless video processing device (QAP) 102.

Figure 18:
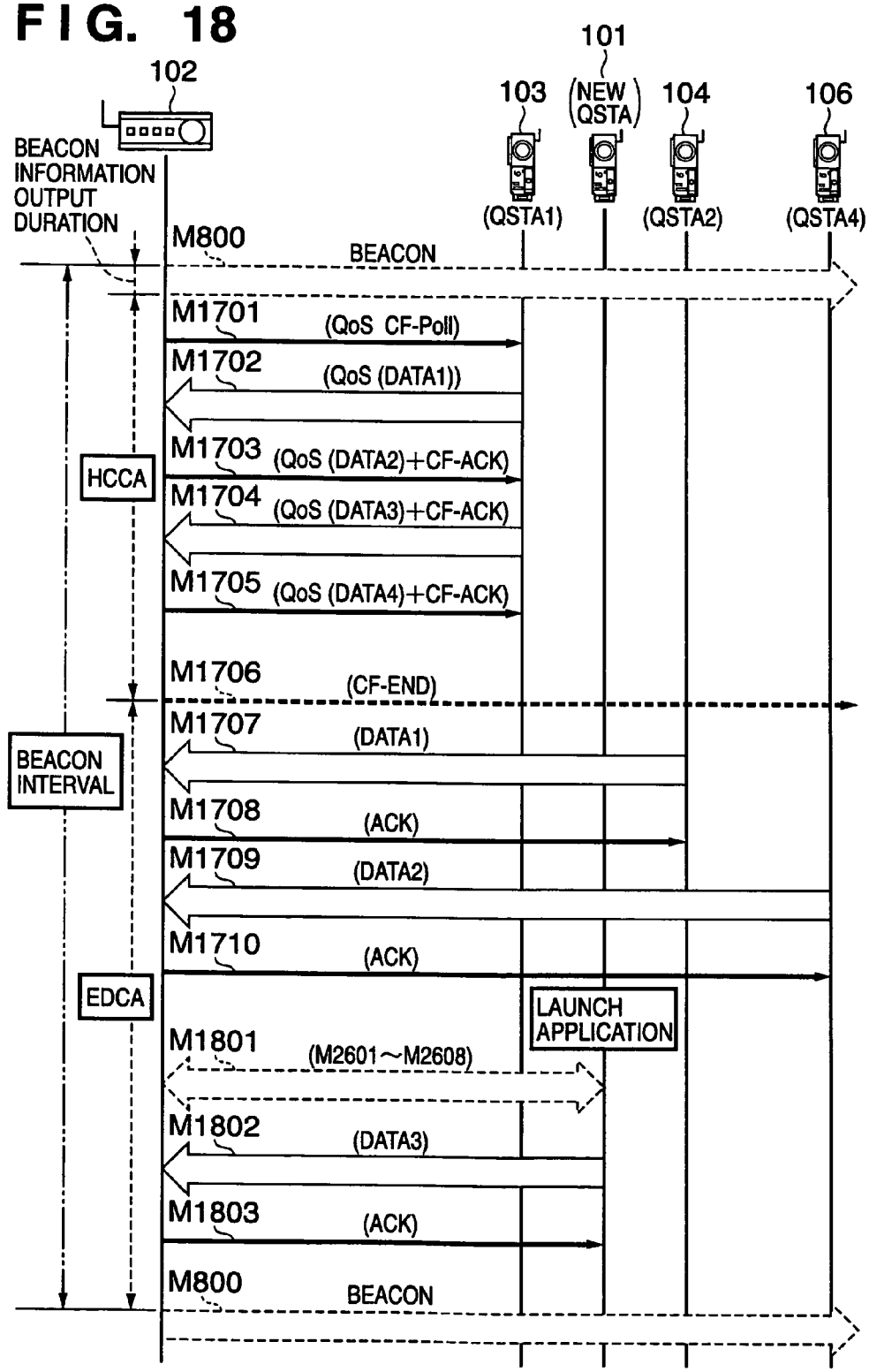
FIG. 18 is a sequence chart for explaining an example of a communication operation between the wireless video processing device and wireless terminal devices upon issuing a TS addition request according to the second embodiment of the present invention.

An example of the communication operation between the wireless video processing device 102 of this embodiment and the wireless terminal devices 101, 103, 104, and 106 of this embodiment upon issuing the TS addition request will be described below using the sequence chart of FIG. 18.

As described above, the wireless video processing device (QAP) 102 and the wireless terminal devices (QSTA1, QSTA2, and QSTA4) 103, 104, and 106 exchange the messages M1701 to M1710. After that, the wireless terminal device (new QSTA) 101 launches a communication application. The wireless video processing device (QAP) 102 and wireless terminal device (new QSTA) 101 then exchange a message M1801. More specifically, this message M1801 includes messages M2601 to M2608 shown in FIG. 19, which will be described later.

Next, the wireless terminal device (new QSTA) 101 exchanges the messages M1802 and M1803 as in the wireless terminal devices (QSTA2 and QSTA4) 104 and 106 in the aforementioned first common processing in FIG. 14.

Figure 19:
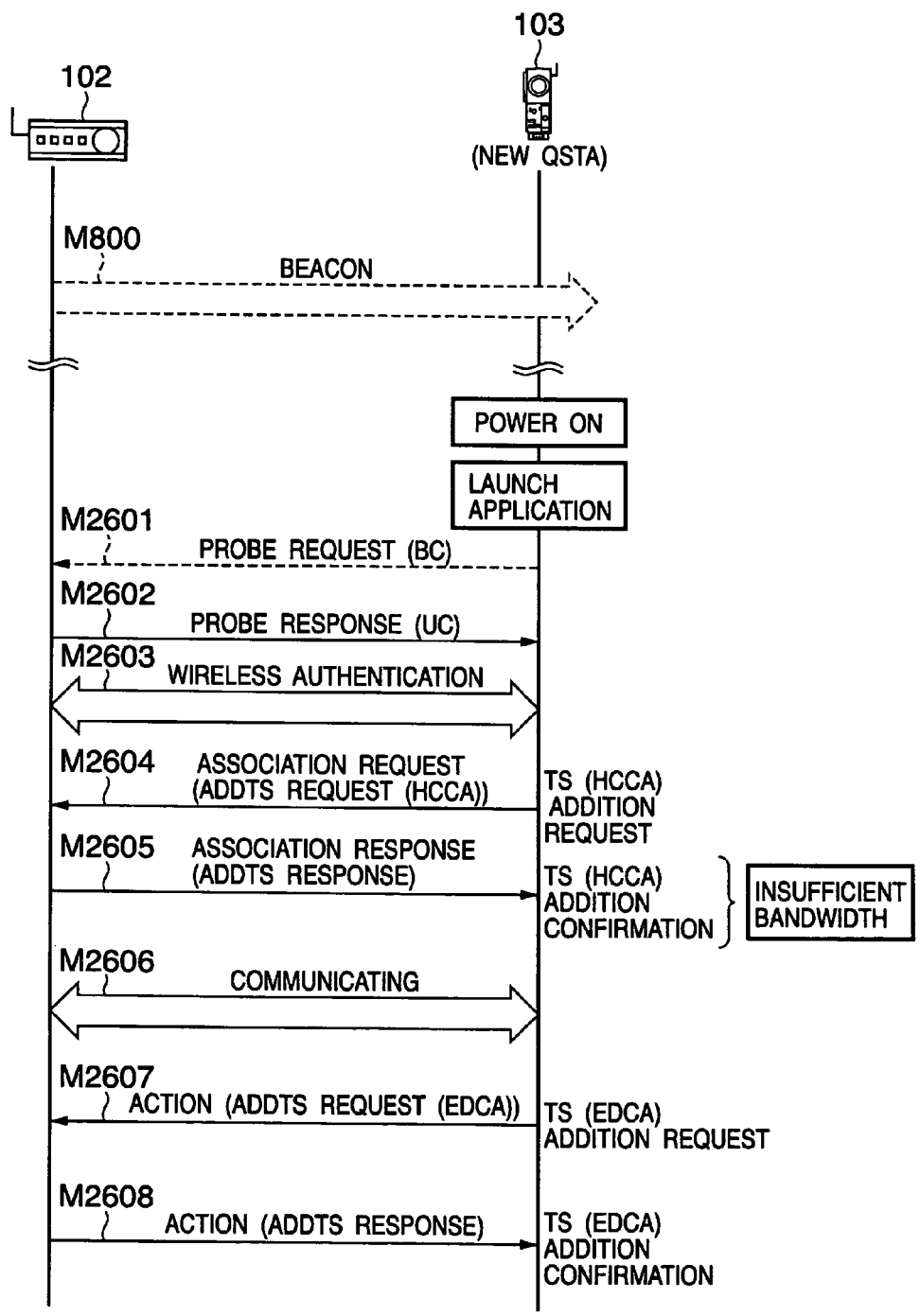
FIG. 19 is a sequence chart for explaining an example of a communication operation between the wireless video processing device and a wireless terminal device (new QSTA) according to the second embodiment of the present invention.

An example of the communication operation between the wireless video processing device 102 of this embodiment and the wireless terminal device (new QSTA) 101 of this embodiment will be described below using the sequence chart of FIG. 19.

The wireless video processing device (QAP) 102 broadcasts the message M800 (beacon information). After that, the wireless terminal device (new QSTA) 101 confirms that its power supply is ON, and launches an arbitrary communication application by a user's operation or the like.

The wireless terminal device (new QSTA) 101 broadcasts a message M2601 as a probe request message so as to find out a wireless video processing device (wireless access point device) which can be connected and accommodated.

Upon reception of this message M2601, the wireless video processing device 102 unicasts a message M902 (probe response message) to the wireless terminal device 101.

The wireless video processing device (QAP) 102 and wireless terminal device (new QSTA) 101 exchange a message M2603 to start authentication sequence processing and to activate an authentication processing completion timer.

Upon completion of the authentication sequence processing, the wireless terminal device (new QSTA) 101 transmits a message M2604 to the wireless video processing device (QAP) 102 to issue an association request including the access control method, type information, and bandwidth requirement. Upon reception of the association request, the wireless video processing device (QAP) 102 activates an association processing completion timer.

If the authentication sequence processing (communication processing of the message M2603) is not complete yet, and the authentication processing completion timer has reached an end, the connection accommodation processing is terminated halfway.

Upon reception of the association request (message M2604), the wireless video processing device (QAP) 102 confirms that association request and the like and determines whether or not it can connect and accommodate the wireless terminal device (new QSTA) 101. As a result of determination, if the wireless video processing device (QAP) 102 can connect and accommodate the wireless terminal device (new QSTA) 101, it transmits a message that advices accordingly and service information which can be provided to the wireless terminal device (new QSTA) 101 to the wireless terminal device (new QSTA) 101. Note that these pieces of information are transmitted as an association response (message M2605). Note that the service information which can be provided to the wireless terminal device (new QSTA) 101 includes, e.g., the access control method (HCCA), type information (video), and bandwidth requirement (TS×1).

Upon completion of the association sequence processing in this way, the wireless video processing device (QAP) 102 and wireless terminal device (new QSTA) 101 complete connection accommodation processing on a wireless link. Then, they transit to a communicating state (communication processing of a message M2606).

If the association sequence processing (exchange processing of the messages M2604 and M2605) is not complete yet, and the association processing completion timer has reached an end, the connection accommodation processing is terminated halfway.

After the communicating state starts, the wireless terminal device (new QSTA) 101 transmits a message M2607 to the wireless video processing device (QAP) 102 as a TS addition request, and activates a TS addition response completion timer.

Upon reception of the TS addition request (message M2607), the wireless video processing device (QAP) 102 confirms, e.g., the access control method (EDCA), type information (video), and bandwidth requirement (TS×3). As a result of confirmation, if a service can be provided, the wireless video processing device (QAP) 102 transmits a TS addition response to the wireless terminal device (new QSTA) 101 as a message M2608.

If the TS addition response message (message M2608) is not received yet and the TS addition response completion timer has reached an end, the wireless terminal device 101 terminates the TS addition request halfway.

Figure 20:
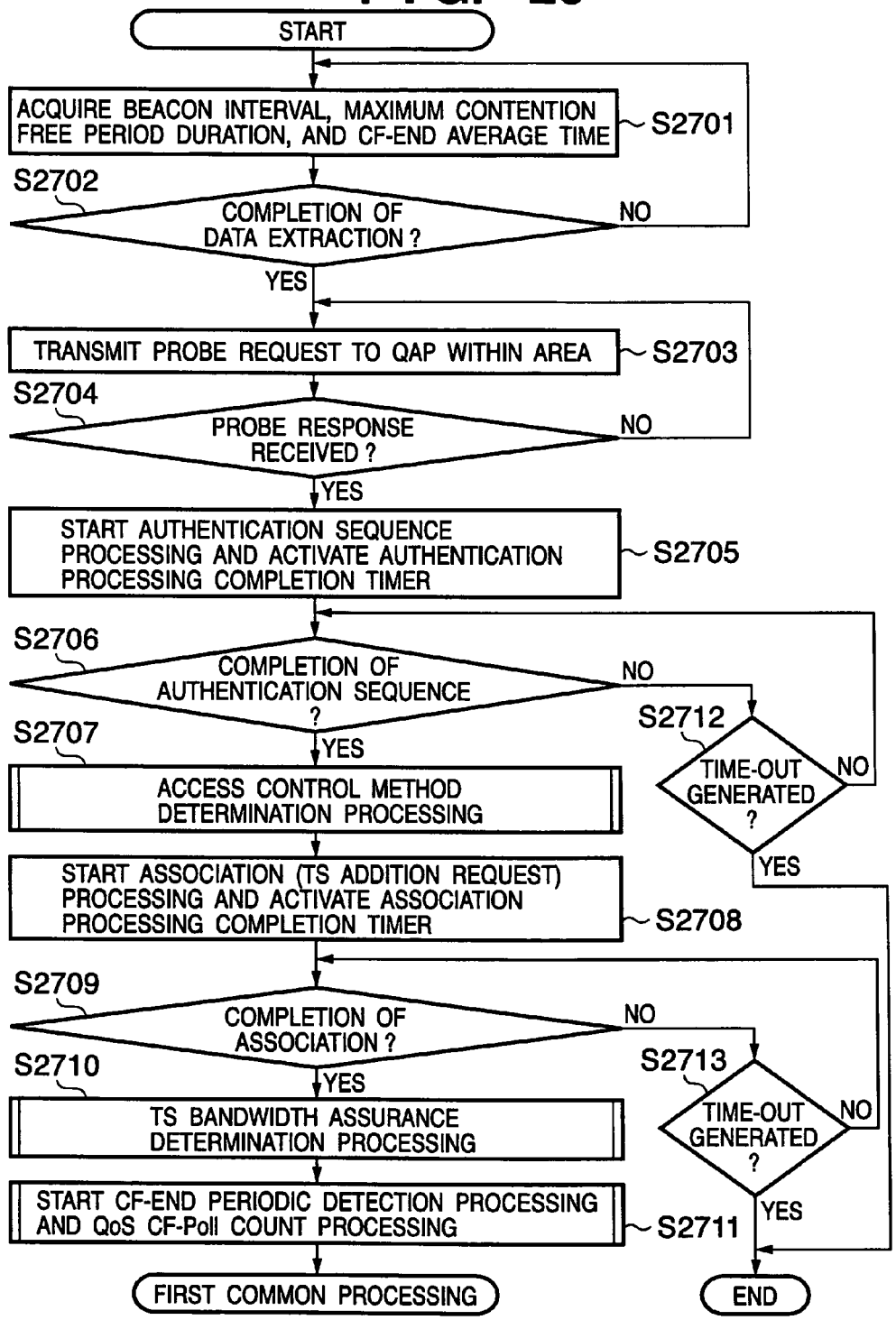
FIG. 20 is a flowchart for explaining an example of the processing operation upon activation and connection accommodation of a wireless terminal device (new QSTA) according to the second embodiment of the present invention.

An example of the processing operation of the wireless terminal device (new QSTA) 101 of this embodiment upon activation and connection accommodation processing will be described below with reference to the flowchart of FIG. 20.

In step S2701, the wireless terminal device 101 acquires the beacon frame interval (T) 602, CFP max duration (P) 604, and CF-END average time (S) 701 from the beacon information (message M800) announced from the wireless video processing device 102.

The wireless terminal device 101 checks in step S2702 if extraction of data to be acquired in step S2701 is complete. As a result of checking, if extraction of data is not complete yet, the wireless terminal device 101 repeats steps S2701 and S2702 until it is completed.

Upon completion of extraction of data, the flow advances to step S2703. In step S2703, the wireless terminal device 101 broadcasts the probe request message (message M2601) for the purpose of finding out a wireless access point device which is located within the service area and can connect and accommodate the wireless terminal device 101.

The wireless terminal device 101 checks in step S2704 if the probe response message (message M2602) is received. As a result of checking, if no probe response message (message M2602) is received, the wireless terminal device 101 repeats steps S2703 and S2704 until it receives that message.

In step S2705, the wireless terminal device 101 executes authentication sequence processing (communication processing of the message M2603) and activates an authentication processing completion timer as in the wireless video processing device 102. The wireless terminal device 101 checks in step S2706 if the authentication sequence processing is complete.

As a result of checking, if the authentication sequence processing is complete, the flow advances to step S2707 to execute access control method determination processing. This access control method determination processing is the same as that in the first embodiment. In case of a specific application which is designated in advance with the access control method of the communication application, the access control method determined in this access control method determination processing is saved in the storage area unit 206.

In step S2708, the wireless terminal device 101 generates a TS addition request message of an association request (message M2604), which includes information indicating the access control method determined in step S2707, type information, and bandwidth requirement. The wireless terminal device 101 then transmits the TS addition request message to the wireless video processing device 102, and activates an association completion timer. Note that the information indicating the access control method determined in step S2707 indicates that, for example, the access control method is the HCCA access control method. Also, the type information is information indicating video, and the bandwidth requirement is TS×3 in this case.

The wireless terminal device 101 checks in step S2709 if the association sequence processing (exchange processing of the messages M2604 and M2605) is complete. As a result of checking, if the association sequence processing is complete, the wireless terminal device 101 executes TS bandwidth assurance determination processing in step S2710. This TS bandwidth assurance determination processing will be described later using FIG. 21.

In step S2711, the wireless terminal device 101 starts CF-END periodic detection processing and QoS CF-Poll count processing to continue the communicating state (communication processing of the message M2606). After that, the wireless terminal device (new QSTA) 101 executes the aforementioned first common processing.

If it is determined in step S2706 that the authentication sequence processing is not complete yet, the flow advances to step S2712 to check if the authentication processing completion timer has reached an end (time-out is generated). As a result, if the authentication processing completion timer has reached an end, the wireless terminal device 101 terminates the connection accommodation processing halfway, thus ending the processing. On the other hand, if the authentication processing completion timer has not reached an end yet, the flow returns to step S2706 to check again if the authentication sequence processing is complete.

If it is determined in step S2709 that the association sequence processing is not complete yet, the flow advances to step S2713 to check if the association completion timer has reached an end (time-out is generated). As a result of checking, if the association completion timer has reached an end, the wireless terminal device 101 terminates the connection accommodation processing halfway, thus ending the processing. On the other hand, if the association completion timer has not reached an end yet, the flow returns to step S2709 to check again if the association sequence processing is complete.

Figure 21:
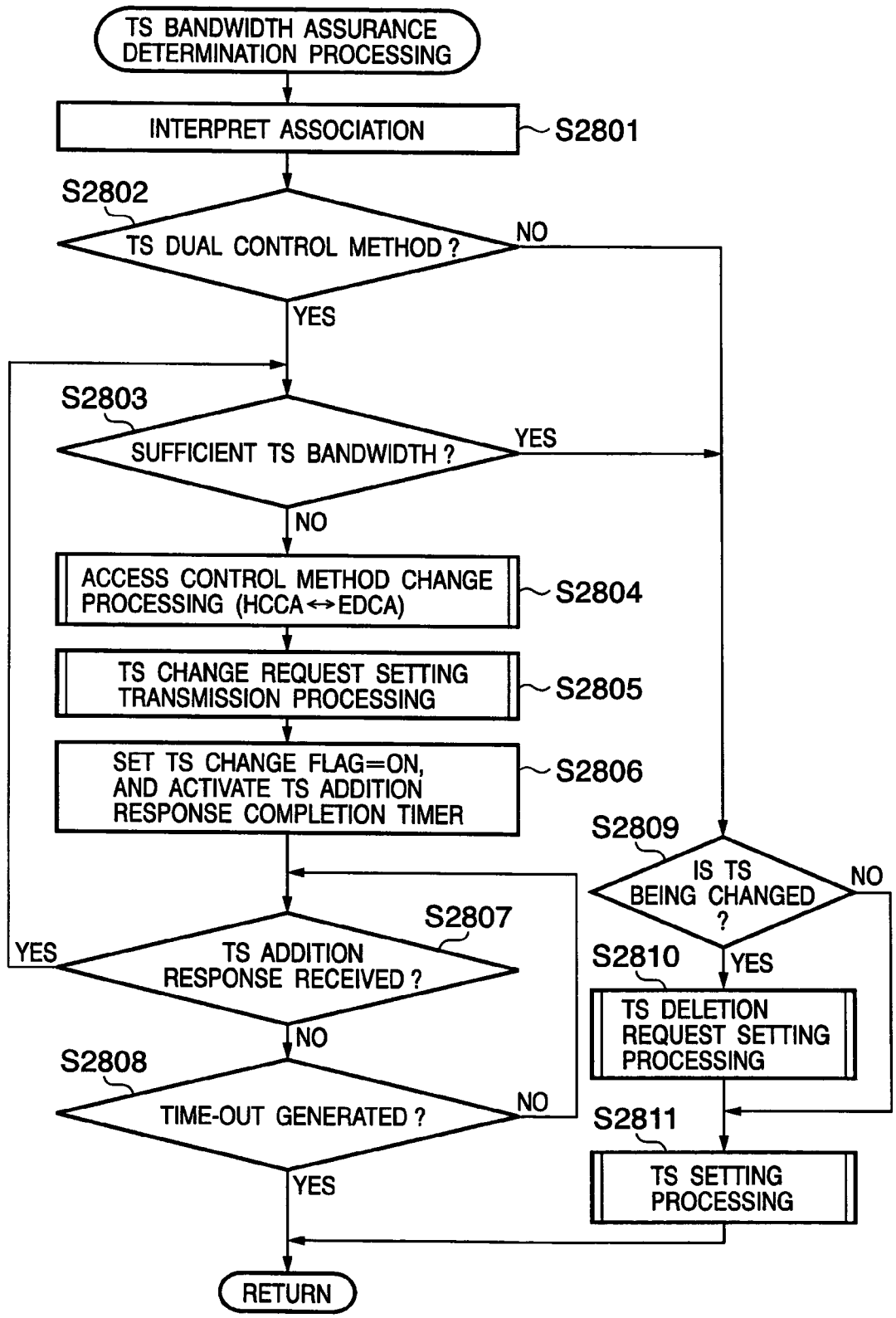
FIG. 21 is a flowchart for explaining an example of TS bandwidth assurance determination processing according to the second embodiment of the present invention.

An example of the TS bandwidth assurance determination processing in step S2710 in FIG. 20 will be described below with reference to the flowchart of FIG. 21.

In step S2801, the wireless terminal device 101 interprets the TS addition response message included in the association response message (message M2605). At this time, the wireless terminal device 101 reads out the access control method determined based on the beacon frame interval (T) 602, CFP max duration (P) 604, and CF-END average time (S) 701 from the storage area unit 206.

The wireless terminal device 101 checks in step S2802 if the access control method is a dual mode corresponding to both the HCCA and EDCA access control methods. As a result of checking, if the access control method is a dual mode, the flow advances to step S2803 to confirm the TS bandwidth which is set in the association response message received from the wireless video processing device (QAP) 102 and can be provided by the wireless video processing device (QAP) 102. Based on this confirmation result, wireless terminal device 101 determines whether or not the TS bandwidth provided by the wireless video processing device (QAP) 102 is sufficient. In this determination step, when, for example, the communication application designates the TS bandwidth, it is checked if the TS bandwidth which can be provided by the wireless video processing device (QAP) 102 satisfies the TS bandwidth designated by the application.

Based on the determination result, if the TS bandwidth provided by the wireless video processing device (QAP) 102 is insufficient, the flow advances to step S2804. In step S2804, the wireless terminal device 101 sets the access control method which is different from the one that can be provided, type information, and bandwidth requirement as parameters of the TS addition request message (message M2607), thus changing the access control method.

In step S2805, the wireless terminal device 101 transmits the TS addition request message to the wireless video processing device (QAP) 102 again.

In step S2806, the wireless terminal device 101 updates a TS change flag (=ON), and activates a TS addition response completion timer.

The wireless terminal device 101 checks in step S2807 if the TS addition response message (message M2608) is received from the wireless video processing device (QAP) 102. As a result of checking, if the TS addition response message (message M2608) is received, the flow returns to step S2803 to check if the TS bandwidth included in that TS addition response message is sufficient.

On the other hand, if no TS addition response message (message M2608) is received from the wireless video processing device (QAP) 102, the flow advances to step S2808 to check if the TS addition response completion timer has reached an end (time-out is generated). As a result of checking, if the TS addition response completion timer has reached an end, the wireless terminal device 101 terminates the TS bandwidth assurance determination processing halfway. On the other hand, if the TS addition response completion timer has not reached an end yet, the flow returns to step S2807 to check again if the TS addition response message (message M2608) is received.

If it is determined in step S2802 that the access control method is not a dual mode corresponding to both the HCCA and EDCA access control methods, and if it is determined in step S2803 that the TS bandwidth is sufficient, the flow advances to step S2809. The wireless terminal device 101 checks in step S2809 if the TS is being changed. As a result of checking, if the TS is being changed, the flow advances to step S2810. In step S2810, the wireless terminal device 101 executes release processing that aims at releasing the TS bandwidth which is assured by the wireless video processing device 102 in the TS addition response (M2605) upon association planned to be used by the access control. Subsequently, the wireless terminal device 101 executes TS setting processing using a bandwidth that can be assured by the new access control method included in the TS addition response message (message M2608) received in step S2807 (step S2811). On the other hand, if the TS is not being changed, the wireless terminal device 101 executes TS bandwidth processing based on the access control method assured in the TS addition response (M2605) upon association in step S2811. After the processing of step S2811 is completed, the wireless terminal device 101 ends the TS bandwidth assurance determination processing.

As described above, when the wireless terminal device 101 cannot assure a sufficient bandwidth in the communication bandwidth request processing executed upon association, it transits to a communication state, and then executes selection determination processing of the access control method again. With this processing, the wireless terminal device 101 transmits a request message associated with a change in access control method used by itself according to a change in transmission bandwidth, addition or deletion of the communication bandwidth, and the like to the wireless video processing device 102.

Next, the operation of the wireless terminal device (QSTA1) 103 as the HCCA dedicated terminal will be described below. Also, the operations of the wireless terminal device (QSTA4) 106 as the EDCA dedicated terminal, and the wireless terminal devices that operate based on the HCCA access control method or EDCA access control method will be described below. As in the wireless terminal device 101, upon completion of the authentication sequence processing with the wireless video processing device 102 (step S2706), the flow advances to step S2708 without executing the access control method determination processing (step S2707). In step S2708, the access control method information ((HCCA or EDCA), type information (video), and bandwidth requirement (TS×3)) is included in TS addition request information elements of the association request message according to each function. Note that "according to each function" indicates the HCCA access control method in case of the wireless terminal device (QSTA1) 103, and the EDCA access control method in case of the wireless terminal device (QSTA4) 106. The TS addition request information elements are transmitted to the wireless video processing device 102, and an association completion timer is activated (step S2708).

Upon reception of the association request message, the wireless video processing device 102 confirms the TS addition request information elements and the like and checks if it can connect and accommodate the wireless terminal devices. If the wireless video processing device 102 can connect and accommodate the wireless terminal devices, it sets a message that advices accordingly, service Information that can be provided, type information (video), and bandwidth requirement (TS×1) as parameter information of an association response message, and transmits the association response message to the wireless terminal devices 103 and 106. Note that the service information that can be provided means the access control method (HCCA or EDCA).

In this case, the contents of the association response message describe that connection accommodation (association+ wireless authentication) is possible, and only TS×1 can be assured as the bandwidth.

Subsequently, upon completion of the association sequence processing with the wireless terminal devices 103 and 106 (step S2709), the wireless video processing device 102 completes the connection accommodation processing on a wireless link and transits to a communicating state. At this time, if the association sequence processing is not complete yet, and the association processing completion timer has reached an end (step S2713), the wireless video processing device 102 terminates the connection accommodation processing halfway. If the association processing completion timer has not reached an end yet, the control returns to the completion confirmation processing (step S2709) of the association sequence processing. Upon completion of the association sequence processing with the wireless video processing device 102, the wireless terminal devices 103 and 106 execute the TS bandwidth assurance determination processing.

In the TS bandwidth assurance determination processing, each of the wireless terminal devices 103 and 106 interprets the TS addition response information element included in the association response message (step S2801). Since the wireless terminal device (QSTA1) 103 as the HCCA dedicated terminal and the wireless terminal device (QSTA4) 106 as the EDCA dedicated terminal do not support the dual control method (step S2802), the flow advances to step S2809. Also, since the TS is not being changed (step S2809), the flow advances to step S2811. In step S2811, TS setting processing is executed using the bandwidth which can be assured based on the access control method information which is received from the wireless video processing device 102 and can be provided by it. Note that the access control method information indicates the access control method (HCCA or EDCA), type information (video), and bandwidth requirement (TS×1). Then, the connection accommodation processing on the wireless link is completed. After that, the CF-END periodic detection processing and QoS CF-Poll count processing are started in step S2711 to continue a communicating state. After that, each wireless terminal device executes the aforementioned first common processing.

As described above, according to this embodiment, upon execution of the connection accommodation processing of the communication application which assures a transmission path simultaneously with activation of the wireless terminal device 101, the wireless terminal device 101 analyzes the access control states associated with a plurality of wireless terminal devices within the service area. In this way, an association state is established using the suited access control method determined by the wireless terminal device 101. At this time, when a desired transmission bandwidth cannot be assured, the TS addition request processing is attempted to assure a desired transmission bandwidth again using the access control method different from the suited access control method. In this manner, in addition to the effects of the aforementioned first embodiment, the ratio of assuring a desired transmission bandwidth can be improved.

Third Embodiment

A wireless video transmission system according to the third embodiment of the present invention will be described below. In the first embodiment, a TS request is started in a communication state. Also, in the second embodiment, the TS request is started upon association and communication. By contrast, changes in beacon frame interval, CFP max duration, and CF-END average time are monitored in a steady state. Upon detection of such changes, access control method determination processing is executed, and when the access control method is to be changed, the TS request is started. In this manner, the TS request timing of this embodiment is mainly different from the first and second embodiments. Hence, in the description of this embodiment, a detailed description of the same parts as those in the first and second embodiments will be omitted as needed.

Figure 22:
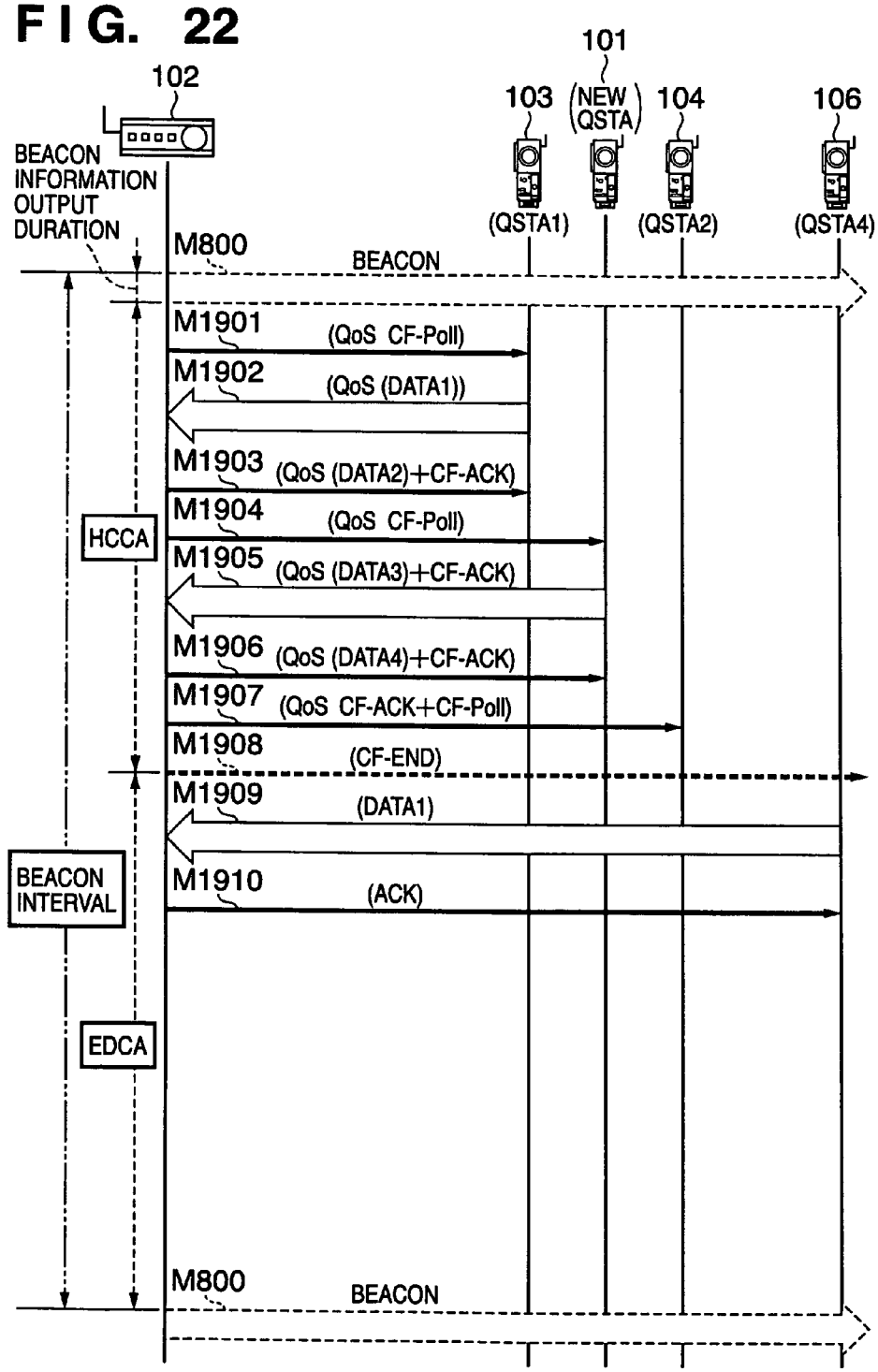
FIG. 22 is a sequence chart showing an example of a communication operation between a wireless video processing device and wireless terminal devices according to the third embodiment of the present invention.

FIG. 22 is a sequence chart of respective devices. Referring to FIG. 22, the wireless video processing device (QAP) 102 of this embodiment, and the wireless terminal devices (new QSTA, QSTA1, and QSTA2) 101, 103, and 104 operate based on the access control method (HCCA). The wireless terminal device (QSTA4) 106 operates based on the access control method (EDCA). Assume that the wireless LAN system of this embodiment is the same as that shown in FIG. 4.

Referring to FIG. 22, when a beacon output timing is reached, the wireless video processing device (QAP) 102 broadcasts beacon information (message M800).

Next, the wireless video processing device (QAP) 102 refers to a polling list which registers wireless terminal devices that make data communications based on the HCCA access control method. The wireless video processing device (QAP) 102 then checks if there is data to be transmitted to the corresponding wireless terminal device. Then, the device 102 sets data to be transmitted in the transmission buffer.

If the polling timing is reached during the HCCA (contention free period) duration, the wireless video processing device (QAP) 102 transmits a message M1901 to the wireless terminal device (QSTA1) 103, thus carrying out polling (Qos CF-Poll).

Upon reception of the message M1901, the wireless terminal device (QSTA1) 103 sets transmission data to be transmitted to the wireless video processing device (QAP) 102 in the transmission buffer. Then, the wireless terminal device (QSTA1) 103 transmits that data (message M1902) to the wireless video processing device (QAP) 102.

Upon reception of the message M1902, the wireless video processing device (QAP) 102 checks if a polling timing is reached. Furthermore, the wireless video processing device (QAP) 102 checks if transmission data such as ACK (Acknowledgment) or the like is set in the transmission buffer. If it is determined that the polling timing is not reached, and transmission data (e.g., ACK) is set in the transmission buffer, the wireless video processing device (QAP) 102 immediately transmits the transmission data to the wireless terminal device (QSTA1) 103 as a message M1903. Note that the message M1903 indicates transmission data and a CF-ACK message.

As in the wireless terminal device (QSTA1) 103, messages M1904 to M1906 are also exchanged with the wireless terminal device (new QSTA) 101 which is connected and accommodated in the wireless video processing device (QAP) 102, based on the HCCA access control method. In FIG. 22, the wireless terminal device (QSTA2) 104 receives a polling message M1907 transmitted from the wireless video processing device (QAP) 102. However, in the wireless terminal device (QSTA2) 104, since there is no transmission data, no data is transmitted from the wireless terminal device (QSTA2) 104 to the wireless video processing device (QAP) 102.

In this way, upon completion of the contention free period (HCCA), the wireless video processing device (QAP) 102 sets a message M1908 (CF-END 402) in the transmission buffer and transmits it within the service area.

After that, when the contention period (EDCA) is reached, the wireless terminal device (QSTA4) 106 sets transmission data to be transmitted to the wireless video processing device (QAP) 102 in the transmission buffer, and confirms the data transmission timing. After that, the wireless terminal device (QSTA4) 106 transmits a message M1909 to the wireless video processing device (QAP) 102.

The wireless video processing device (QAP) 102 transmits, as a message M1910, transmission data such as ACK (Acknowledgment) and the like and a CF-ACK message to the wireless terminal device (QSTA4) 106 as the transmission source of the message M1909.

Figure 23:
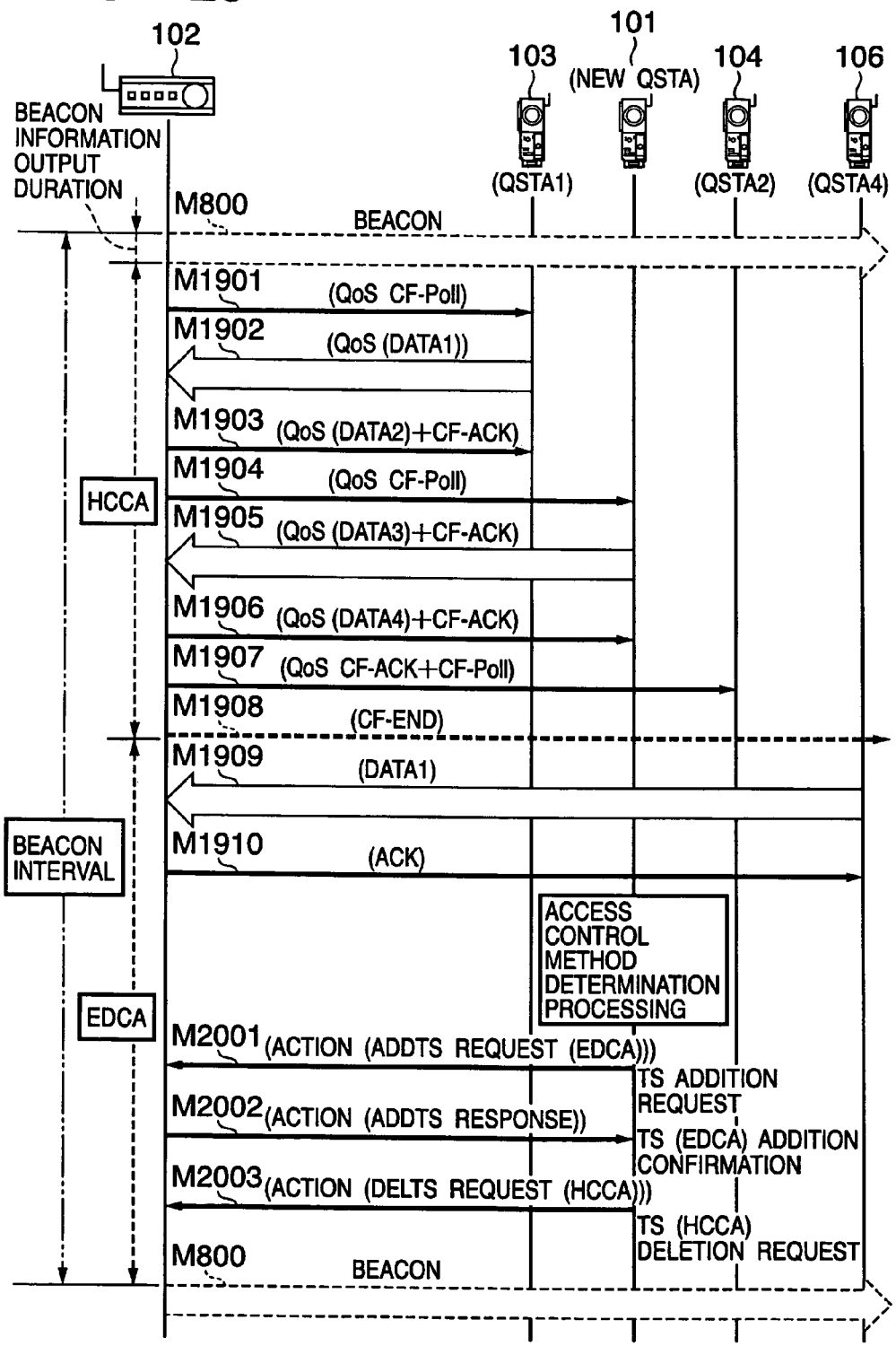
FIG. 23 is a sequence chart for explaining an example of a communication operation between the wireless video processing device when a wireless terminal device (new QSTA) issues a TS addition request, and wireless terminal devices (new QSTA, QSTA1, QSTA2, and QSTA4) according to the third embodiment of the present invention.

An example of the communication operation between the wireless video processing device (QAP) 102 and the wireless terminal devices (new QSTA, QSTA1, QSTA2, and QSTA4) 101, 103, 104, and 106 will be explained below with reference to the sequence chart of FIG. 23. FIG. 23 shows the following state. That is, the wireless terminal device (new QSTA) 101 based on the access control method (HCCA) monitors changes in beacon frame interval, CFP max duration, and CF-END average time in a steady state. If one of these variables has changed, the access control method determination processing is executed again. As a result, a TS addition request is issued to change the access control method from HCCA to EDCA.

The wireless video processing device (QAP) 102 and the wireless terminal devices (new QSTA, QSTA1, QSTA2, and QSTA4) 101, 103, 104, and 106 exchange the messages M1901 to M1910, as described above.

After that, changes in beacon frame interval, CFP max duration, and CF-END average time are monitored. Upon detection of a change in any of beacon frame interval, CFP max duration, and CF-END average time in the wireless terminal device, the access mode determination processing as common processing of the wireless terminal devices is executed. As a result, the wireless terminal device (new QSTA) 101 determines that the access control is changed to that based on the EDCA method. The wireless terminal device (new QSTA) 101 transmits a message M2001 to the wireless video processing device (QAP) 102 as a TS addition request message that requests access control based on the EDCA access control method. The access control method determination processing has been described previously using FIG. 15.

Upon reception of the TS addition request message, the wireless video processing device (QAP) 102 confirms that TS addition request message. If the wireless video processing device (QAP) 102 can connect and accommodate the wireless terminal device (new QSTA) 101, it transmits a message M2002 to the wireless terminal device (new QSTA) 101. The message M2002 serves as a TS addition response message which permits access control based on the EDCA access control method.

Upon reception of the TS addition response message, the wireless terminal device (new QSTA) 101 transmits a message M2003 to the wireless video processing device (QAP) 102 as a TS deletion request message that requests to delete access control based on the HCCA access control method.

Figure 24:
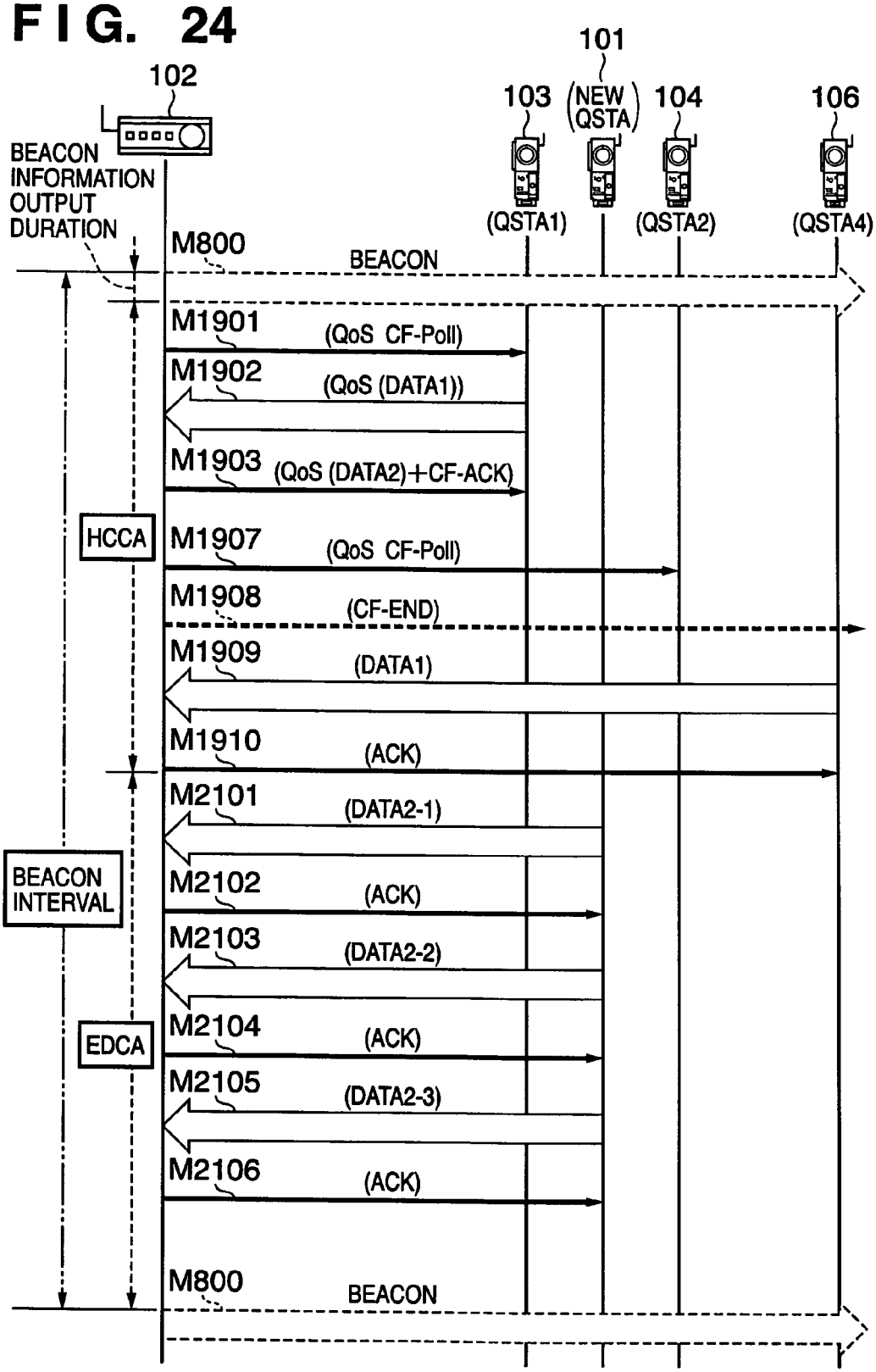
FIG. 24 is a sequence chart for explaining an example of a communication operation between the wireless video processing device after the wireless terminal device (new QSTA) issues a TS addition request, and wireless terminal devices (new QSTA, QSTA1, QSTA2, and QSTA4) according to the third embodiment of the present invention.

An example of the communication operation between the wireless video processing device (QAP) 102 and the wireless terminal devices (new QSTA, QSTA1, QSTA2, and QSTA4) 101, 103, 104, and 106 will be explained below with reference to the sequence chart of FIG. 24. FIG. 24 shows the operation after the wireless terminal device (new QSTA) 101 issues the TS addition request.

The wireless video processing device (QAP) 102 and the wireless terminal devices (new QSTA, QSTA1, QSTA2, and QSTA4) 101, 103, 104, and 106 exchange the messages M1901 to M1903 and M1907 to M1910, as described above.

After that, if there is data to be transmitted to the wireless video processing device (QAP) 102, the wireless terminal device (new QSTA) 101 sets that data in the transmission buffer. After the data transmission timing is confirmed during the EDCA duration, the wireless terminal device (new QSTA) 101 transmits data (messages M2101, M2103, and M2105) to the wireless video processing device 102 using a user bandwidth permitted to the wireless video processing device 102.

Upon reception of the data, the wireless video processing device 102 returns ACK as reception acknowledgment of that data as messages M2102, M2104, and M2106.

Figure 25:
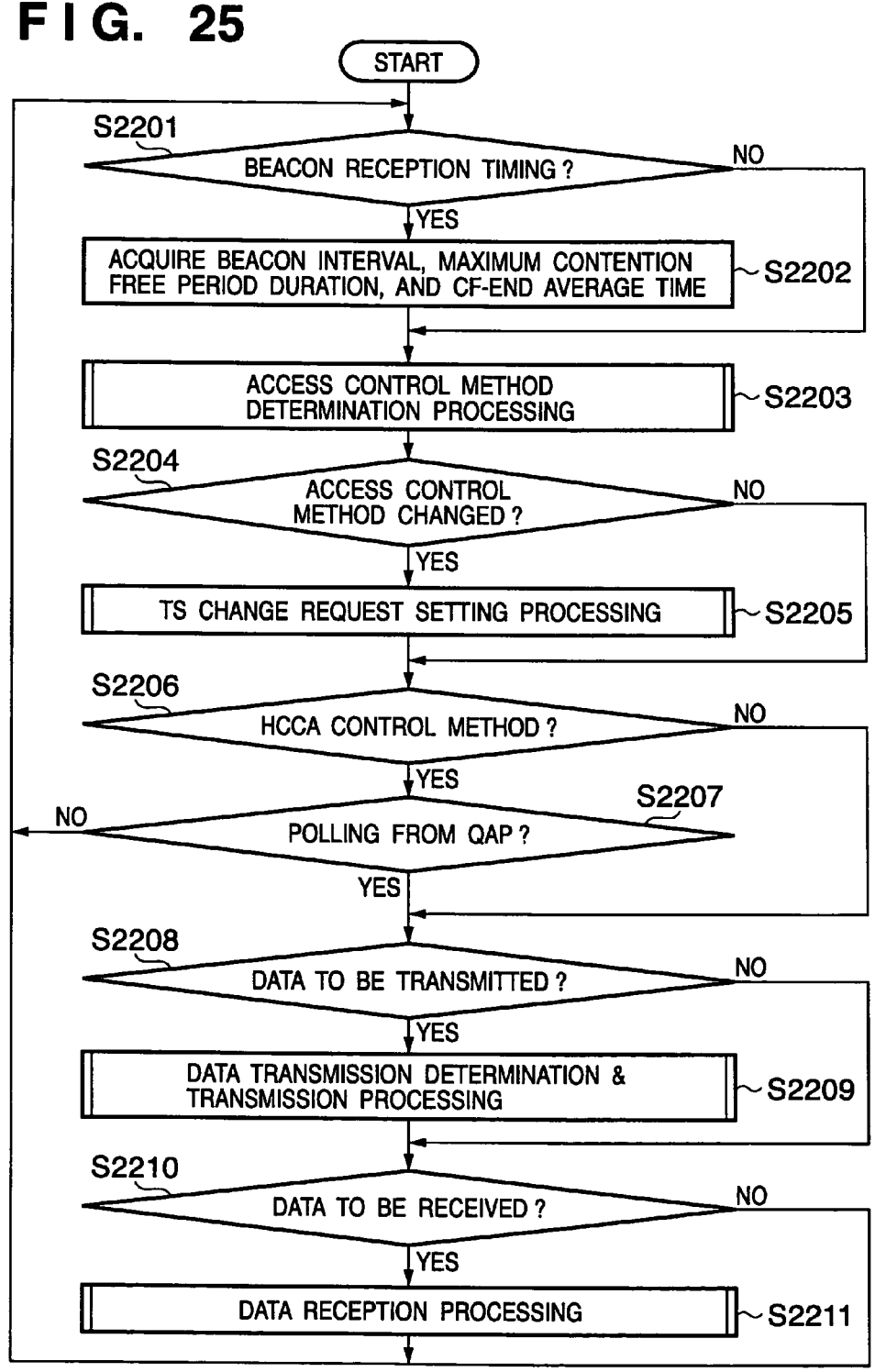
FIG. 25 is a flowchart for explaining an example of the processing operation of the wireless terminal devices (new QSTA, QSTA1, QSTA2, and QSTA4) according to the third embodiment of the present invention.

An example of the processing operation of the wireless terminal devices (new QSTA, QSTA1, QSTA2, and QSTA4) 101, 103, 104, and 106 will be described below with reference to the flowchart of FIG. 25.

The wireless terminal device checks in step S2201 if the reception timing of the message M800 (beacon information) is reached. As a result, if the reception timing of the message M800 (beacon information) is reached, the flow advances to step S2202. In step S2202, the wireless terminal device acquires the beacon frame interval (T) 602 and CFP max duration (P) 604 from the beacon information (message M800) announced from the wireless video processing device 102. Also, the wireless terminal device calculates the CF-END average time.

On the other hand, if the reception timing of the message M800 (beacon information) is not reached, the flow jumps to step S2203 by skipping step S2202.

In step S2203, the wireless terminal device executes access control method determination processing. This access control method determination processing is the same as that in the first embodiment.

Next, the wireless terminal device checks based on the result of the access control method determination processing in step S2203 if the access control method is to be changed. If the access control method determined in step S2203 is different from that which is currently used in communication, and the access control method is to be changed, the flow advances to step S2205. As described above, in the example shown in FIGS. 23 and 24, wireless terminal device (new QSTA) 101 changes the access control method.

In step S2205, the wireless terminal device transmits a TS addition request message (message M2001) which includes information associated with the access control method designated by the communication application, type information, and bandwidth requirement. After that, the wireless terminal device changes the access control method. Note that the information associated with the access control method is information indicating that the access control method is the EDCA access control method in the example of FIGS. 23 and 24. Also, the type information is information indicating video, and the bandwidth requirement is TS×3.

On the other hand, if it is determined in step S2204 that the access control method determined in step S2203 is the same as that which is currently used in communication, and the access control method is not to be changed, the flow jumps to step S2206 by skipping step S2205. As described above, in the example shown in FIGS. 23 and 24, the wireless terminal devices (QSTA1, QSTA2, and QSTA4) 103, 104, and 106 do not change the access control method.

The wireless terminal device checks in step S2206 if an HCCA (contention free period) duration is reached. As described above, in the example shown in FIGS. 23 and 24, the wireless terminal devices (QSTA1 and QSTA2) 103 and 104 communicate in the HCCA (contention free period) duration, and the wireless terminal devices (new QSTA and QSTA4) 101 and 106 communicate in the EDCA (contention period) duration.

As a result of checking, if the HCCA (contention free period) duration is reached, the flow advances to step S2207 to check if polling from the wireless video processing device (QAP) 102 is done. As a result of checking, if polling is done, the flow advances to step S2208 to check if there is data to be transmitted to the wireless video processing device (QAP) 102. As a result of checking, if there is data to be transmitted, the flow advances to step S2209 to set the data to be transmitted in the transmission buffer. After confirmation of the data transmission timing, the wireless terminal device transmits the data (e.g., messages M1902, M1905, and M1909) to the wireless video processing device (QAP) 102.

On the other hand, if there is no data to be transmitted, the flow skips step S2209 and jumps to step S2210. The wireless terminal device checks in step S2210 if there is data (e.g., messages M1901, M1904, M1907, and M1910) to be received from the wireless video processing device (QAP) 102. As a result of checking, if there is data to be received from the wireless video processing device (QAP) 102, the flow advances to step S2211 to execute processing for receiving data from the wireless video processing device (QAP) 102. After that, the processes in steps S2201 to S2211 are repeated.

If it is determined in step S2206 that the HCCA (contention free period) duration is not reached, the flow jumps to step S2208 by skipping step S2207.

Figure 26:
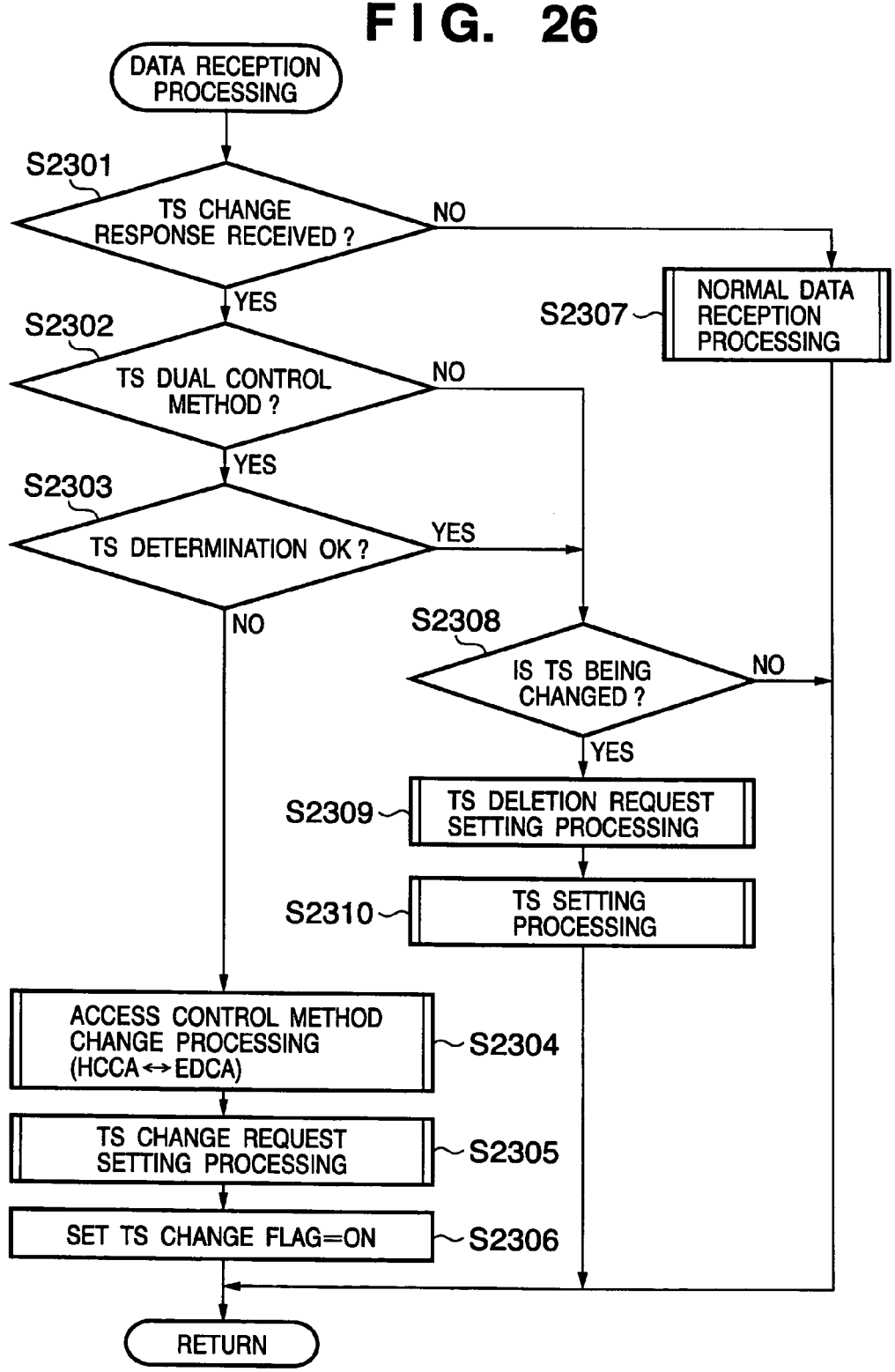
FIG. 26 is a flowchart for explaining an example of data reception processing according to the third embodiment of the present invention.

An example of the data reception processing in step S2211 will be described below with reference to the flowchart of FIG. 26.

The wireless terminal device checks in step S2301 if the TS addition response message (message M2002) is received. As a result of checking, if the TS addition response message (message M2002) is received, the flow advances to step S2302. In the example shown in FIGS. 23 and 24, wireless terminal device (new QSTA) 101 receives the TS addition response message (message M2002).

The wireless terminal device checks in step S2302 if access control in the dual mode that can support the both the HCCA and EDCA access control methods is required. As a result of checking, if the access control based on the dual control method is required, the flow advances to step S2303. The wireless terminal device checks in step S2303 based on service information received from the wireless video processing device 102 if the bandwidth or the like of the access control method included in the TS addition response message is sufficient. Note that the received service information includes, e.g., the access control method (EDCA), type information (video), and bandwidth requirement (TS×3).

As a result of checking, if the bandwidth or the like of the access control method received from the wireless video processing device 102 is insufficient, the flow advances to step S2304. In step S2304, the wireless terminal device changes the access control method to the access control method (e.g., the access control method (HCCA), type information (video), and bandwidth requirement (TS×2)) different from the received one.

In step S2305, the wireless terminal device sets the changed access control method in parameters of the TS addition request message, and sets that message as transmission data. Furthermore, in step S2306 the wireless terminal device updates a TS change flag (=ON), and continues the communicating state with the wireless video processing device 102. The control then returns to the flowchart of FIG. 25. Note that the TS addition request message is transmitted to the wireless video processing device 102 in step S2209 in FIG. 25.

If it is determined in step S2301 that no TS addition response message (message M2002) is received, the flow advances to step S2307 to execute normal data reception processing.

If it is determined in step S2302 that no access control in the dual mode that can support both the HCCA and EDCA access control methods is required, the flow advances to step S2308. Also, if it is determined in step S2302 that the bandwidth or the like of the access control method included in the TS addition response message is sufficient, the flow advances to step S2308. The wireless terminal device checks in step S2308 if the access control method is being changed.

As a result of checking, if the access control method is being changed, the flow advances to step S2309. In step S2309, for example, the wireless terminal device releases transmission of data based on the access control method (HCCA), type information (video), and bandwidth requirement (TS×1) before change. Furthermore, a TS deletion request message (message M2003) is set in the wireless video processing device (QAP) 102 as transmission data. Next, in step S2310 the wireless terminal device executes TS setting processing based on the access control method (EDCA), type information (video), and bandwidth of the bandwidth requirement (TS×3) after change. On the other hand, if the access control method is not being changed, the control returns to the flowchart of FIG. 25.

As described above, according to this embodiment, the wireless terminal device 101 steadily executes selection determination processing of the access control method (access control method determination processing). The wireless terminal device 101 steadily monitors the access control method associated with the plurality of wireless terminal devices within the service area provided by the wireless video processing device 102. Furthermore, upon detection of a change in access control method (e.g., a change in transmission bandwidth), the wireless terminal device 101 transmits a TS addition request message to the wireless video processing device 102 depending on the change of the access control method. Note that the TS addition request message pertains to a change in access control method itself used by itself and addition (or deletion) of the communication bandwidth. As a result, when it is determined that the access control method under the better condition than the current access control method can be selected, the wireless terminal device 101 autonomously changes its own access control method and can broaden the transmission bandwidth without any instruction received from the wireless video processing device 102 as the QAP. Furthermore, since the transmission bandwidth used so far is released, the resources in the system can be effectively used.

First Modification

[Cancel Dynamic Change in Access Control Method under Specific Condition]

In the aforementioned first embodiment, the access control method determination processing is executed upon launching the communication application, and the requested access control method is selected and set for the wireless video processing device 102. In the second embodiment, when the access control method is designated in advance for a specific communication application, the access control method determination processing is skipped. Furthermore, a request message of the communication bandwidth is transmitted to the wireless video processing device 102 using the designated access control method. However, upon requesting the communication bandwidth, if it is revealed in advance that the communication transmission path is occupied for a long period of time irrespective of a specific communication application, the present invention is not limited to such processing. That is, one of the HCCA and EDCA access control methods may be fixedly selected.

Second Modification

[Change Data Compression Ratio Depending on Difference of Access Control Method]

In the aforementioned third embodiment, the wireless terminal device 101 steadily executes the access control method selection determination processing. With this processing, the access control method used by itself is changed from the HCCA (contention free period) access control method to the EDCA (contention period) access control method according to a change in transmission bandwidth that takes place within the service area. Furthermore, in order to delete the communication bandwidth which becomes unused, a message that requests to delete the communication bandwidth is transmitted to the wireless video processing device 102. However, the present invention is not limited to such specific processing. Likewise, the access control method used by itself may be changed from the EDCA (contention period) access control method to the HCCA (contention free period) access control method according to a change in transmission bandwidth.

Upon exchanging streaming data, e.g., movie transmission, the following processing may be executed. When the HCCA (contention free period) access control method is used anew in correspondence with a change in access control method, a higher transmission data compression ratio than use of EDCA (contention period) may be set to execute data transmission. Also, when the EDCA (contention period) method is used anew, a low transmission data compression ratio may be set to perform burst transmission.

Third Modification

In the access control method determination processing of the above embodiments, the beacon frame interval (T) 602 and the like are acquired based on the beacon information (message M800) announced from the wireless video processing device 102. Then, the acquired beacon frame interval (T) 602, CFP max duration 604, and CF-END average time (S) 701 are substituted in the first and second conditional formulas 702 and 703. Furthermore, based on the first and second conditional formulas 702 and 703, a selection mode 704 as the access control method is determined. However, an actual polling count (N) in the contention free period may be used in place of the CF-END average time (S) 701. That is, the beacon frame interval (T) 602, CFP max duration 604, and actual polling count (N) in the contention free period may be used in the first conditional formula 702 and a third conditional formula 2403. Based on these formulas, a new selection mode 2404 as the access control method may be determined.

Details of the access control method determination processing in this modification will be described below using FIGS. 27 and 28.

FIG. 27 shows an example of the configuration of an access control method determination table according to this modification.

Referring to FIG. 27, reference numeral 2401 denotes an actual polling count (N) (times) carried out within the contention free period (CFP). Reference numeral 2403 denotes a third condition expressed using the CFP max duration (P) 604 and polling count (N). Reference numeral 2404 denotes a type (selection method) of access control method selected based on the first conditional formula 702 and third conditional formula 2403. Note that selection methods E2411 to E2417 take as an example a case wherein the beacon frame interval (T) 602 is 10,000 (μs). The CFP max durations (P) 604 of these methods E2411 to E2417 are respectively 8,000, 8,000, 5,000, 5,000, 5,000, 3,000, and 3,000 (μs). Furthermore, the polling counts (N) 2401 of these methods E2411 to E2417 are respectively 5, 1, 8, 5, 1, 5, and 1 (times).

Figure 28:
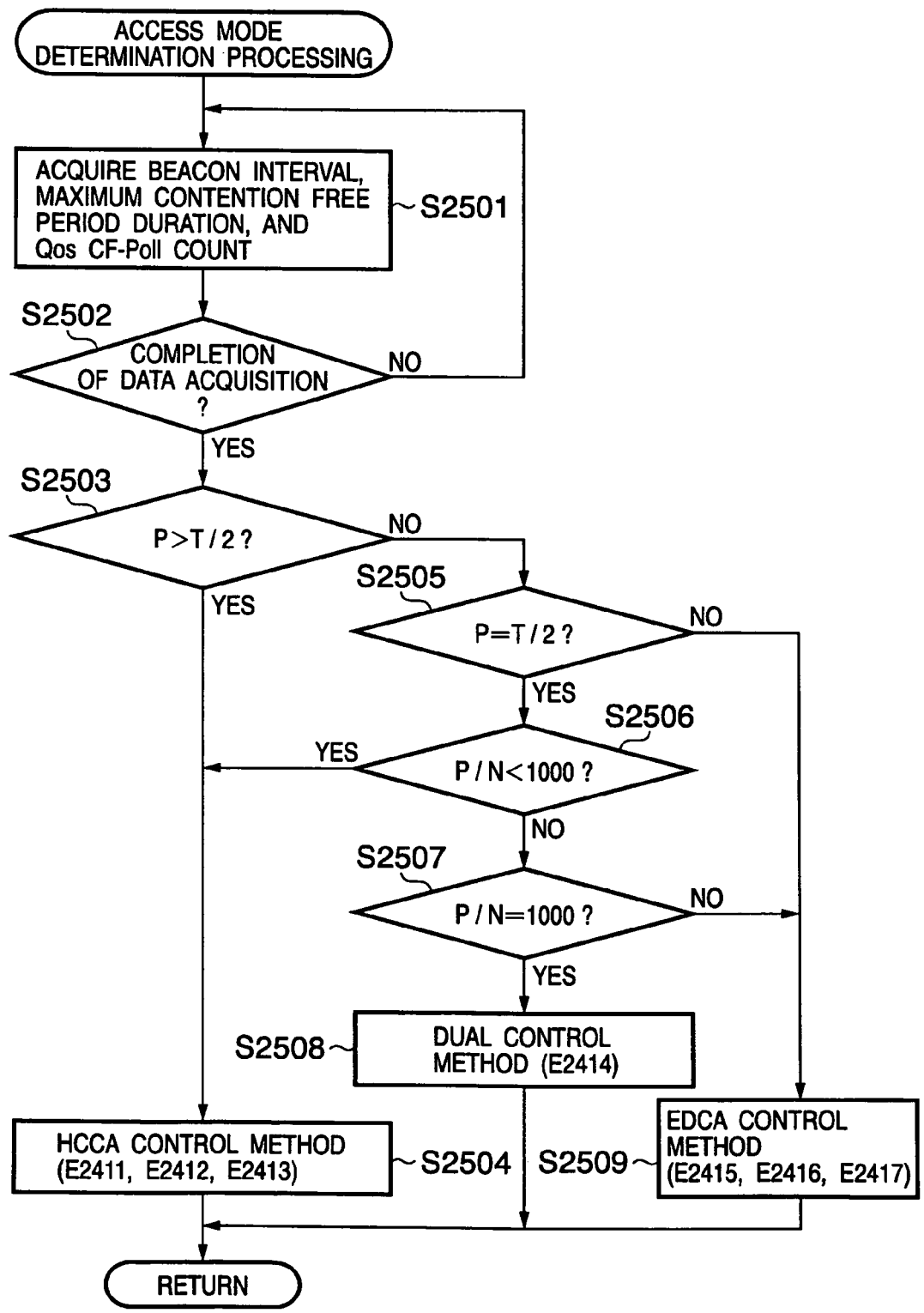
FIG. 28 is a flowchart for explaining an example of access control method determination processing according to the third modification of the embodiment of the present invention.

FIG. 28 is a flowchart for explaining an example of the access control method determination processing of the wireless terminal devices 101 and 103 to 106 of this modification.

The wireless terminal device acquires the beacon frame interval (T) 602, CFP max duration (P) 604, and polling count (N) 2401 from the beacon information (message M800) announced from the wireless video processing device 102 in step S2501.

The wireless terminal device checks in step S2502 if acquisition of data in step S2501 is complete. As a result of checking, if acquisition of data is not complete yet, the wireless terminal device repeats steps S2501 and S2502 until it is completed.

In steps S2503 to S2509, the wireless terminal device determines a selection method 2404 as the access control method based on a first conditional formula 702 and third conditional formula 2403. Note that the beacon frame interval (T) 602, CFP max duration (P) 604, and polling count (N) 2401 are used upon determination.

More specifically, the wireless terminal device checks in step S2503 if the first conditional formula 702 satisfies P>T/2. As a result of checking if the first conditional formula 702 satisfies P>T/2, the flow advances to step S2504 to select the HCCA access control method (E2411, E2412) according to the polling count (N) 2401.

If the first conditional formula 702 does not satisfy P>T/2, the wireless terminal device checks in step S2505 if the first conditional formula 702 satisfies P=T/2. As a result of checking, if the first conditional formula 702 satisfies P=T/2, the flow advances to step S2506 to check if the third conditional formula 2403 satisfies P/N<1000. As a result of checking, if the third conditional formula 2403 satisfies P/N<1000, the flow advances to step S2504 to select the HCCA access control method (E2413).

On the other hand, if the third conditional formula 2403 does not satisfy P/N<1000, the flow advances to step S2507 to check if the third conditional formula 2403 satisfies P/N=1000. As a result of checking, if the third conditional formula 2403 satisfies P/N=1000, the flow advances to step S2508 to select the HCCA/EDCA dual access control method (E2414).

On the other hand, if the third conditional formula 2403 does not satisfy P/N=1000, the flow advances to step S2509 to select the EDCA access control method (E2415).

If it is determined in step S2505 that the first conditional formula 702 does not satisfy P=T/2, the flow advances to step S2509 to select the EDCA access control method (E2416, E2417).

In each of the aforementioned embodiments, the control method of flexibly setting and switching the communication bandwidth in response to a request of the communication bandwidth by the wireless terminal device (QSTA) and wireless video processing device (QAP) taking the wireless LAN network that provides the QoS as an example. However, the present invention is not limited to such specific embodiments.

For example, the wireless video processing device is not limited to a device such as a liquid crystal projector which projects image data onto a screen, but it may be a peripheral device which can output an image such as a moving image and the like. Also, the wireless video processing device may be any other devices such as a storage server and the like irrespective of analog/digital signals to be handled, as long as they have a communication function. In addition, the present invention can be variously modified without departing from the scope of the invention.

Another Embodiment of Present Invention

The scope of the present invention includes a case wherein various devices are operated based on a program code to implement the functions of the aforementioned embodiments. More specifically, a program code of software that implements the functions of the embodiments is supplied to a computer (or a CPU or MPU) in a system or apparatus, which is connected to the various devices. Then, the various devices are operated according to the program stored in the computer of the system or apparatus.

In this case, the program code itself of software implements the functions of the above embodiments. The program code itself, and means for supplying the program code to the computer (e.g., a recording medium which stores the program code) constitutes the present invention. As the recording medium for storing the program code, for example, a flexible disk, hard disk, optical disk, magneto-optical disk, CD-ROM, magnetic tape, nonvolatile memory card, ROM, and the like may be used.

The present invention is not limited to a case wherein the functions of the above embodiments are implemented when the computer executes the supplied program code. For example, the functions of the above embodiments may be implemented by collaboration of the program code and an OS (operating system) running on the computer, another application software, or the like. In such case, the program code is included in the embodiments of the present invention.

Furthermore, the supplied program code may be stored in a memory equipped on a function extension board of the computer or a function extension unit connected to the computer. In this case, a CPU or the like equipped on the function extension board or unit executes some or all of actual processes on the basis of the instruction of that program code, and the functions of the above embodiments are implemented by those processes. The program code in such case is also included in the present invention.

The present invention is not limited to the above embodiments and various changes and modifications can be made within the spirit and scope of the present invention. Therefore to apprise the public of the scope of the present invention, the following claims are made.

This application claims the benefit of Japanese Patent Application No. 2005-099517, filed on Mar. 30, 2005, which is hereby incorporated by reference herein in its entirety.

What is claimed is:

1. A wireless terminal device which undergoes communication control by a wireless control device via a wireless transmission path when the wireless terminal device exists within an area managed by the wireless control device, comprising:
an interpretation unit configured to interpret annunciation information transmitted from the wireless control device; and
a request unit configured to transmit, to the wireless control device, a request message which includes access control method information indicating a communication using one of the central control method and the distributed control method based on the interpretation result provided by the interpretation unit,
wherein the central control method is a method in which the wireless control device makes communication control in a contention free period as a time domain that can be exclusively used by one wireless terminal device on a shared wireless transmission path,
the distributed control method is a method in which the wireless control device makes communication control in a contention period as a time domain in which a plurality of wireless terminal devices randomly make communication using a predetermined sequence,
the annunciation information is information which announces that data transmission period information including the contention free period and the contention period are used as a data transmission frame interval, and
when relations among a maximum contention free duration P, a data transmission frame interval T as a maximum value of the contention free period, and an average time S of the actual contention free periods included in the annunciation information satisfy $P=T/2$ and $S<T/2$, the request unit transmits, to the wireless control device, a request message including access control method information indicating communication control using the distributed control method.

2. A wireless terminal device which undergoes communication control by a wireless control device via a wireless transmission path when the wireless terminal device exists within an area managed by the wireless control device, comprising:
an interpretation unit configured to interpret annunciation information transmitted from the wireless control device; and
a request unit configured to transmit, to the wireless control device, a request message which includes access control method information indicating a communication using one of the central control method and the distributed control method based on the interpretation result provided by the interpretation unit,
wherein the central control method is a method in which the wireless control device makes communication control in a contention free period as a time domain that can be exclusively used by one wireless terminal device on a shared wireless transmission path,
the distributed control method is a method in which the wireless control device makes communication control in a contention period as a time domain in which a plurality of wireless terminal devices randomly make communication using a predetermined sequence,
the annunciation information is information which announces that data transmission period information including the contention free period and the contention period are used as a data transmission frame interval, and
when relations among a maximum contention free duration P, a data transmission frame interval T as a maximum value of the contention free period, and an average time S of the actual contention free periods included in the annunciation information satisfy $P>T/2>S$, the request unit transmits, to the wireless control device, a request message including access control method information indicating communication control using the distributed control method.

3. A wireless terminal device which undergoes communication control by a wireless control device via a wireless transmission path when the wireless terminal device exists within an area managed by the wireless control device, comprising:

an interpretation unit configured to interpret annunciation information transmitted from the wireless control device; and a request unit configured to transmit, to the wireless control device, a request message which includes access control method information indicating a communication using one of the central control method and the distributed control method based on the interpretation result provided by the interpretation unit, wherein the central control method is a method in which the wireless control device makes communication control in a contention free period as a time domain that can be exclusively used by one wireless terminal device on a shared wireless transmission path, the distributed control method is a method in which the wireless control device makes communication control in a contention period as a time domain in which a plurality of wireless terminal devices randomly make communication using a predetermined sequence, the annunciation information is information which announces that data transmission period information including the contention free period and the contention period are used as a data transmission frame interval, and when relations among a maximum contention free duration P, a data transmission frame interval T as a maximum value of the contention free period, and an average time S of the actual contention free periods included in the annunciation information satisfy $P>T/2$ and $S>T/2$, the request unit transmits, to the wireless control device, a request message including access control method information indicating communication control using the central control method.

4. A wireless terminal device which undergoes communication control by a wireless control device via a wireless transmission path when the wireless terminal device exists within an area managed by the wireless control device, comprising:

an interpretation unit configured to interpret annunciation information transmitted from the wireless control device;

a request unit configured to transmit, to the wireless control device, a request message which includes access control method information indicating a communication using one of the central control method and the distributed control method based on the interpretation result provided by the interpretation unit, wherein the central control method is a method in which the wireless control device makes communication control in a contention free period as a time domain that can be exclusively used by one wireless terminal device on a shared wireless transmission path, the distributed control method is a method in which the wireless control device makes communication control in a contention period as a time domain in which a plurality of wireless terminal devices randomly make communication using a predetermined sequence, and the annunciation information is information which announces that data transmission period information including the contention free period and the contention period are used as a data transmission frame interval; and a selection unit configured to select one of the central control method and the distributed control method when relations among a maximum contention free duration P, a data transmission frame interval T as a maximum value of the contention free period, and an average time S of the actual contention free periods included in the annunciation information satisfy $P=T/2$ and $S \geq T/2$, wherein the request unit transmits, to the wireless control device, a first request message which includes access control method information indicating a communication using the control method selected by the selection unit and bandwidth information indicating a communication bandwidth required in the wireless transmission path, when a response message to the first request message transmitted by the request unit is received from the wireless control device, the interpretation unit interprets contents of the response message, and when the communication bandwidth indicated by the bandwidth information included in the first request message cannot be assured as a result of interpretation by the interpretation unit, the request unit transmits, to the wireless control device, a second request message which includes access control method information indicating communication control using the other control method which is not selected by the selection unit.

5. A wireless terminal device which undergoes communication control by a wireless control device via a wireless transmission path when the wireless terminal device exists within an area managed by the wireless control device, comprising:

an interpretation unit configured to interpret annunciation information transmitted from the wireless control device; and a request unit configured to transmit, to the wireless control device, a request message which includes access control method information indicating a communication using one of the central control method and the distributed control method based on the interpretation result provided by the interpretation unit, wherein the central control method is a method in which the wireless control device makes communication control in a contention free period as a time domain that can be exclusively used by one wireless terminal device on a shared wireless transmission path, the distributed control method is a method in which the wireless control device makes communication control in a contention period as a time domain in which a plurality of wireless terminal devices randomly make communication using a predetermined sequence, the annunciation information is information which announces that data transmission period information including the contention free period and the contention period are used as a data transmission frame interval, and when relations among a maximum contention free duration P as a maximum value of the contention free period, a data transmission frame interval T, a polling count N in an actual contention free period included in the annunciation information, and a constant C satisfy $P=T/2$ and $P/N<C$, the request unit transmits, to the wireless control device, a request message including access control method information indicating communication control using the central control method.

6. A wireless terminal device which undergoes communication control by a wireless control device via a wireless transmission path when the wireless terminal device exists within an area managed by the wireless control device, comprising:
- an interpretation unit configured to interpret annunciation information transmitted from the wireless control device; and
- a request unit configured to transmit, to the wireless control device, a request message which includes access control method information indicating a communication using one of the central control method and the distributed control method based on the interpretation result provided by the interpretation unit,
- wherein the central control method is a method in which the wireless control device makes communication control in a contention free period as a time domain that can be exclusively used by one wireless terminal device on a shared wireless transmission path,
- the distributed control method is a method in which the wireless control device makes communication control in a contention period as a time domain in which a plurality of wireless terminal devices randomly make communication using a predetermined sequence,
- the annunciation information is information which announces that data transmission period information including the contention free period and the contention period are used as a data transmission frame interval, and
- when relations among a maximum contention free duration P as a maximum value of the contention free period, a data transmission frame interval T, a polling count N in an actual contention free period included in the annunciation information, and a constant C satisfy $P=T/2$ and $P/N>C$, the request unit transmits, to the wireless control device, a request message including access control method information indicating communication control using the distributed control method.

7. A wireless terminal device which undergoes communication control by a wireless control device via a wireless transmission path when the wireless terminal device exists within an area managed by the wireless control device, comprising:
- an interpretation unit configured to interpret annunciation information transmitted from the wireless control device;
- a request unit configured to transmit, to the wireless control device, a request message which includes access control method information indicating a communication using one of the central control method and the distributed control method based on the interpretation result provided by the interpretation unit,
- wherein the central control method is a method in which the wireless control device makes communication control in a contention free period as a time domain that can be exclusively used by one wireless terminal device on a shared wireless transmission path,
- the distributed control method is a method in which the wireless control device makes communication control in a contention period as a time domain in which a plurality of wireless terminal devices randomly make communication using a predetermined sequence, and
- the annunciation information is information which announces that data transmission period information including the contention free period and the contention period are used as a data transmission frame interval; and
- a selection unit configured to select one of the central control method and the distributed control method when relations among a maximum contention free duration P as a maximum value of the contention free period, a data transmission frame interval T, a polling count N in an actual contention free period included in the annunciation information, and a constant C satisfy $P=T/2$ and $P/N=C$,
- wherein the request unit transmits, to the wireless control device, a first request message which includes access control method information indicating communication control using the control method selected by the selection unit and bandwidth information indicating a communication bandwidth required in the wireless transmission path,
- when a response message to the first request message transmitted by the request unit is received from the wireless control device, the interpretation unit interprets contents of the response message, and
- when the communication bandwidth indicated by the bandwidth information included in the first request message cannot be assured as a result of interpretation by the interpretation unit, the request unit transmits, to the wireless control device, a second request message which includes access control method information indicating communication control using the other control method which is not selected by the selection unit.

* * * * *